United States Patent
Hasegawa et al.

(10) Patent No.: US 9,866,419 B2
(45) Date of Patent: *Jan. 9, 2018

(54) TRANSMISSION APPARATUS, RECEPTION APPARATUS, AND COMMUNICATION SYSTEM

(71) Applicant: Mitsubishi Electric Corporation, Chiyoda-ku (JP)

(72) Inventors: Fumihiro Hasegawa, Tokyo (JP); Hiroshi Nishimoto, Tokyo (JP); Masatsugu Higashinaka, Tokyo (JP); Akihiro Okazaki, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/466,189

(22) Filed: Mar. 22, 2017

(65) Prior Publication Data

US 2017/0195156 A1 Jul. 6, 2017

Related U.S. Application Data

(63) Continuation of application No. 14/772,236, filed as application No. PCT/JP2014/055311 on Mar. 3, 2014, now Pat. No. 9,680,681.

(30) Foreign Application Priority Data

Mar. 4, 2013 (JP) .................................. 2013-041963

(51) Int. Cl.
*H04L 27/00* (2006.01)
*H04L 27/26* (2006.01)
(Continued)

(52) U.S. Cl.
CPC ...... *H04L 27/2636* (2013.01); *H04L 27/2628* (2013.01); *H04L 27/2678* (2013.01);
(Continued)

(58) Field of Classification Search
CPC ............... H04L 27/2602; H04L 1/0041; H04L 25/0232; H04L 1/0625; H04L 27/2626
(Continued)

(56) References Cited

U.S. PATENT DOCUMENTS

| | | | |
|---|---|---|---|
| 5,920,598 | A | 7/1999 | Hyakudai et al. |
| 6,625,111 | B1 | 9/2003 | Sudo |

(Continued)

FOREIGN PATENT DOCUMENTS

| | | |
|---|---|---|
| EP | 1 868 336 A2 | 12/2007 |
| EP | 1 931 070 A1 | 6/2008 |

(Continued)

OTHER PUBLICATIONS

Office Action dated Feb. 24, 2017 in co-pending U.S. Appl. No. 14/773,975.

(Continued)

*Primary Examiner* — Leila Malek

(74) *Attorney, Agent, or Firm* — Oblon, McClelland, Maier & Neustadt, L.L.P.

(57) ABSTRACT

A transmission apparatus that transmits a block signal including a plurality of data symbols, includes a data-symbol generation unit that generates data symbols; a fixed-symbol arrangement unit that arranges a data symbol and a fixed symbol such that the fixed symbol is inserted at a predetermined position in the block signal to generate a block symbol; an interpolation unit that performs interpolation processing on the block symbol; and a CP insertion (Continued)

unit that inserts a Cyclic Prefix into a signal on which the interpolation processing has been performed to generate the block signal.

1 Claim, 23 Drawing Sheets

(51) Int. Cl.
*H04L 25/02* (2006.01)
*H04L 1/00* (2006.01)

(52) U.S. Cl.
CPC ........ *H04L 1/0041* (2013.01); *H04L 25/0232* (2013.01); *H04L 27/2602* (2013.01)

(58) Field of Classification Search
USPC .......................................... 375/295, 219, 260
See application file for complete search history.

(56) References Cited

U.S. PATENT DOCUMENTS

| | | | |
|---|---|---|---|
| 7,558,190 B2 | 7/2009 | Sudo | |
| 7,609,610 B2 | 10/2009 | Abe et al. | |
| 7,715,492 B2 | 5/2010 | Seki | |
| 8,213,538 B2 | 7/2012 | Richardson et al. | |
| 8,542,770 B2 | 9/2013 | Nakao et al. | |
| 9,503,284 B2 | 11/2016 | Nazarathy | |
| 9,680,681 B2 | 6/2017 | Hasegawa et al. | |
| 2004/0220986 A1 | 11/2004 | Pisoni | |
| 2005/0232374 A1 | 10/2005 | Mantyla et al. | |
| 2007/0140106 A1* | 6/2007 | Tsai | H04B 7/2681 370/208 |
| 2007/0286310 A1 | 12/2007 | Fukuoka et al. | |
| 2008/0222482 A1 | 9/2008 | Ban | |
| 2009/0238290 A1* | 9/2009 | Imai | H04B 7/0613 375/260 |
| 2010/0034311 A1 | 2/2010 | Hasegawa | |
| 2010/0142364 A1 | 6/2010 | Sahlman | |
| 2010/0150069 A1 | 6/2010 | Fang et al. | |
| 2011/0150128 A1 | 6/2011 | Yamazaki | |
| 2012/0099681 A1 | 4/2012 | Yoshimochi et al. | |
| 2013/0114659 A1 | 5/2013 | Murakami et al. | |
| 2013/0142177 A1 | 6/2013 | Nentwig | |
| 2014/0247872 A1 | 9/2014 | Merkle et al. | |
| 2016/0013963 A1 | 1/2016 | Hasegawa et al. | |
| 2016/0277936 A1 | 9/2016 | Hasegawa | |

FOREIGN PATENT DOCUMENTS

| | | |
|---|---|---|
| JP | 10 308713 | 11/1998 |
| JP | 2000 269919 | 9/2000 |
| JP | 2004 201286 | 7/2004 |
| JP | 2007 329588 | 12/2007 |
| JP | 2008 136055 | 6/2008 |
| JP | 2012-090080 A | 5/2012 |
| JP | 2012 209703 | 10/2012 |
| JP | 2013 201549 | 10/2013 |
| WO | 2008 065901 | 6/2008 |
| WO | 2010 055639 | 5/2010 |
| WO | 2014/136726 A1 | 9/2014 |

OTHER PUBLICATIONS

Hasegawa, F., et al., "A Novel Out-Of-Band Power Suppression Method for SC-OFDM", Proceedings of the 2013 IEICE General Conference Tsushin 1, IEICE, (2013), (Total pp. 2).

Hasegawa, F., et al., "A Novel Out-of-Band Spectrum Suppression Method without Data Loss", IEICE Technical Report, vol. 113, No. 194, (2013), (Total pp. 7).

Benvenuto, N., et al., "Single Carrier Modulation With Nonlinear Frequency Domain Equalization: An Idea Whose Time Has Come—Again", Proceedings of the IEEE, vol. 98, No. 1, (2010), pp. 69-96.

Bingham, J. A. C., "Multicarrier Modulation for Data Transmission: An Idea Whose Time Has Come", IEEE Communications Magazine, vol. 28, No. 5, (1990), (Total pp. 8).

Porat, B., "A Course in Digital Signal Processing", John Wiley and Sons Inc., (1997), (submitting cover only).

Rappaport, T.S., "Wireless Communications", $2^{nd}$ edition, Prentice Hall PTR, (2002), (submitting cover only).

Chung, C.-D., "Spectrally Precoded OFDM", IEEE Transactions on Communications, vol. 54, No. 12, (2006), pp. 2173-2185.

Faulkner, M., "The Effect of Filtering on the Performance of OFDM Systems", IEEE Transactions on Vehicular Technology, vol. 49, No. 5, (2000), pp. 1877-1884.

Tan, J., et al., "Frequency-Domain Equalizatino for Continuous Phase Modulation", IEEE Transactions on Wireless Communication, vol. 4, No. 5, (2005), pp. 2479-2490.

Van De Beek, J., et al., "N-continuous OFDM", IEEE Communications Letters, vol. 13, No. 1, (2009), pp. 1-3.

International Search Report dated Apr. 8, 2014 in PCT/JP2014/055311 Filed Mar. 3, 2014.

European Search Report dated Dec. 5, 2016, issued in European Patent Application No. 14760621.4.

Office Action dated Jul. 28, 2017 in co-pending U.S. Appl. No. 14/773,975.

Laurie B. Nelson, et al., "Iterative Multiuser Receivers for CDMA Channels: An EM-based Approach", IEEE Transactions on Communications, Dec. 1996, vol. 44, No. 12, pp. 1700-1710.

David C. Chu, "Polyphase Codes With Good Periodic Correlation Properties", IEEE Transactions on Information Theory, Jul. 1972, pp. 531-532.

Ivan Cosovic, et al., "Subcarrier Weighting: A Method for Sidelobe Suppression in OFDM Systems" IEEE Communications Letters, Jun. 2006, vol. 10, No. 6, pp. 444-446.

Char-Dir Chung, "Spectrally Precoded OFDM", IEEE Transactions on Communications, Dec. 2006, vol. 54, No. 12, pp. 2173-2185.

International Search Report dated Oct. 7, 2014 for PCT/JP2014/070372 filed on Aug. 1, 2014.

U.S. Office Action dated Jan. 31, 2017, issued in co-pending U.S. Appl. No. 14/909,928.

U.S. Office Action dated Sep. 16, 2016, issued in co-pending U.S. Appl. No. 14/909,928.

\* cited by examiner

FIG.21

|  |  | kth BLOCK | k+1TH BLOCK |  |
|---|---|---|---|---|
| HIGH-ORDER TWO BITS ARE FIXED TO "11" → | 1 | ⓛⓛ0100 | 111111 |  |
|  | 2 | 101010 | 010100 |  |
|  | 3 | 010011 | 101100 |  |
|  | 4 | 000110 | 010000 |  |
|  | ⋮ | ⋮ | ⋮ |  |
| HIGH-ORDER TWO BITS ARE FIXED TO "11" → | $N-N_{CP}+1$ | ⓛⓛ0001 | 000000 |  |
|  | ⋮ ⋯ | ⋮ | ⋮ | ⋯ |
|  | N-1 | 000111 | 101010 |  |
|  | N | 110100 | 111011 |  |

TRANSMISSION APPARATUS, RECEPTION APPARATUS, AND COMMUNICATION SYSTEM

CROSS-REFERENCE TO RELATED APPLICATIONS

This application is a continuation of U.S. patent application Ser. No. 14/772,236, filed Sep. 2, 2015, which is a National Stage Application of PCT Application No. PCT/JP2014/055311, filed Mar. 3, 2014, which claims priority to Japanese Patent Application No. 2013-041963, filed Mar. 4, 2013. The entire contents of U.S. patent application Ser. No. 14/772,236 are incorporated herein by reference in their entirety.

FIELD

The present invention relates to a transmission apparatus, a reception apparatus, and a communication system.

BACKGROUND

In a digital communication system, frequency selectivity and time variability in a transmission line arise because of multipath phasing caused by a transmission signal being reflected by buildings or the like or Doppler variation caused by the terminal moving. In such a multipath environment, a received signal becomes a signal in which a transmission symbol and a symbol arriving after a delay time interfere with each other.

With this kind of transmission line having frequency selectivity, a single carrier block transmission method has recently attracted attention in order to acquire the best receiving characteristics (see, for example, Non Patent Literature 1 listed below). The single carrier (SC) block transmission system can reduce the peak power compared with an OFDM (Orthogonal Frequency Division Multiplexing) transmission method, which is multi-carrier (Multiple Carrier: MC) block transmission (see, for example, Non Patent Literature 2 listed below).

With a transmitter that performs SC block transmission, measures against multipath phasing are taken by performing, for example, the following kinds of transmission. First, after generating a PSK (Phase Shift Keying) signal or a QAM (Quadrature Amplitude Modulation) signal, which are digital modulation signals, in a "Modulator", the digital modulation signal is converted to a time domain signal by a precoder and an IDFT (Inverse Discrete Fourier Transform) processing unit. Thereafter, as a measure against multipath phasing, a CP (Cyclic Prefix) is inserted by a CP insertion unit. The CP insertion unit copies a predetermined number of samples behind the time domain signal and adds the samples to the head of a transmission signal. In addition to this method, as a measure against multipath phasing, ZP (Zero Padding: zero insertion) is performed by inserting zero into a start portion and an end portion of data.

Furthermore, in order to suppress transmission peak power, in a transmitter that performs SC transmission, a precoder normally performs DFT (Discrete Fourier Transform) processing.

CITATION LIST

Non Patent Literatures

Non Patent Literature 1: N. Benvenuto, R. Dinis, D. Falconer and S. Tomasin, "Single Carrier Modulation With Nonlinear Frequency Domain Equalization: An Idea Whose Time Has Come-Again", Proceeding of the IEEE, vol. 98, no. 1, January 2010, pp. 69-96.

Non Patent Literature 2: J. A. C. Bingham, "Multicarrier Modulation for Data Transmission: An idea Whose Time Has Come", IEEE Commun. Mag., vol. 28, no. 5, May 1990, pp. 5-14.

SUMMARY

Technical Problem

According to the conventional SC block transmission technique described above, transmission peak power is suppressed while the effect of multipath phasing is reduced. However, with the SC block transmission, the phase and the amplitude become discontinuous between the SC blocks, and thus out-of-band spectrum or out-of-band leakage occurs. Because the out-of-band spectrum interferes with an adjacent channel, the out-of-band spectrum needs to be suppressed. Further, in a general communication system, a spectral mask is defined, and the out-of-band spectrum needs to be suppressed so as to satisfy the mask.

The present invention has been achieved in view of the above problems, and an object of the present invention is to provide a transmission apparatus, a reception apparatus, and a communication system that can suppress an out-of-band spectrum.

Solution to Problem

In order to solve the above problems and achieve the object, an aspect of the present invention is a transmission apparatus that transmits a block signal including a plurality of data symbols, the transmission apparatus including: a data-symbol generation unit that generates data symbols; a symbol arrangement unit that arranges the data symbol and same-quadrant symbols such that two or more same-quadrant symbols that become signal points in a same quadrant in a complex plane are inserted at predetermined positions in a block signal to generate a block symbol; an interpolation unit that performs interpolation processing on the block symbol; and a CP insertion unit that inserts a Cyclic Prefix into a signal on which the interpolation processing has been performed to generate the block signal.

Advantageous Effects of Invention

The transmission apparatus according to the present invention has an effect that an out-of-band spectrum can be suppressed.

BRIEF DESCRIPTION OF DRAWINGS

FIG. 21 is a diagram illustrating an example of symbol values when 64QAM same quadrant mapping is performed.

DESCRIPTION OF EMBODIMENTS

Exemplary embodiments of a transmission apparatus, a reception apparatus, and a communication system according to the present invention will be explained below in detail with reference to the accompanying drawings. The present invention is not limited to the embodiments.

First Embodiment

Figure 1:
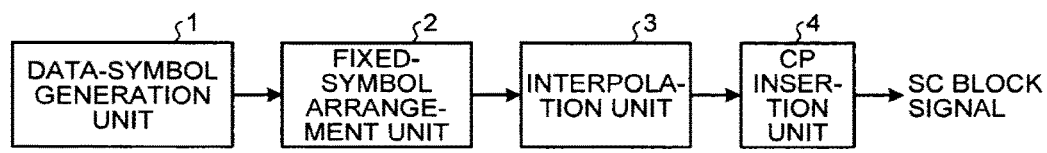
FIG. 1 is a diagram illustrating a functional configuration example of a transmission apparatus according to a first embodiment.

FIG. 1 is a diagram illustrating a functional configuration example of a transmission apparatus according to a first embodiment of the present invention. As illustrated in FIG. 1, the transmission apparatus according to the present invention includes a data-symbol generation unit 1, a fixed-symbol arrangement unit (symbol arrangement unit) 2, an interpolation unit 3, and a CP insertion unit 4.

The data-symbol generation unit 1 generates data symbols (for example, a PSK (Phase Shift Keying) symbol and a QAM (Quadrature Amplitude Modulation) symbol). The fixed-symbol arrangement unit 2 arranges a preassigned fixed symbol at a predetermined position between data symbols to generate a block symbol (symbols for one block consisting of data symbols and fixed symbols). The interpolation unit 3 converts the data symbols after arrangement of the fixed symbol to a frequency domain signal once and then converts the frequency domain signal again to a time domain signal. The CP insertion unit 4 inserts a CP into the time domain signal converted by the interpolation unit 3. The CP-inserted signal is transmitted as an SC block signal (block signal). It is assumed that one block signal consists of N symbols and one frame consists of $N_F$ block symbols.

Figure 2:
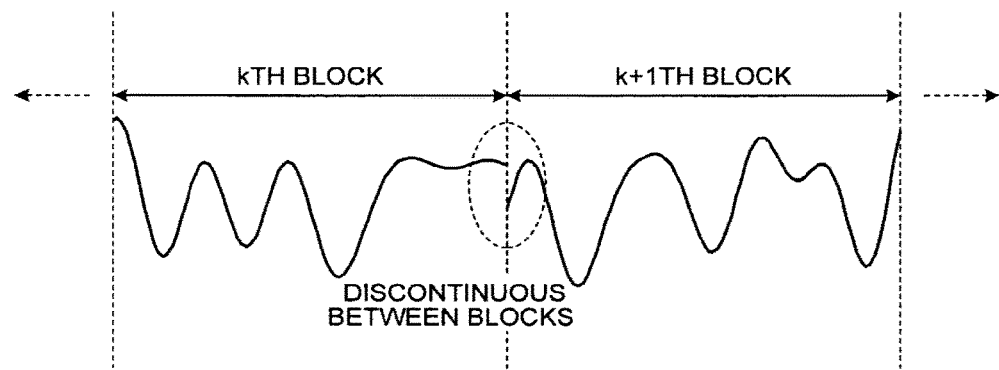
FIG. 2 is a diagram illustrating an example in which phase and amplitude become discontinuous between SC blocks in conventional SC block transmission.

Conventional SC block transmission is described here. In the SC block transmission, the phase and the amplitude become discontinuous between SC blocks. FIG. 2 is a diagram illustrating an example in which the phase and the amplitude become discontinuous between SC blocks in the conventional SC block transmission. In the example in FIG. 2, the out-of-band spectrum or the out-of-band leakage occurs between the k-th (k is an integer) block and the (k+1)th block. Such an out-of-band spectrum interferes with an adjacent channel. In the present embodiment, the out-of-band spectrum is reduced by inserting a fixed symbol between data symbols.

An operation according to the present embodiment is described next. It is assumed that CP insertion is performed for each block and one block consists of N (N is an integer equal to or larger than 1) data symbols. In this case, if it is assumed that the number of fixed symbols to be arranged in one block (per N data symbols) is x, the data-symbol generation unit 1 outputs (N-x) data symbols for each block.

Figure 3:
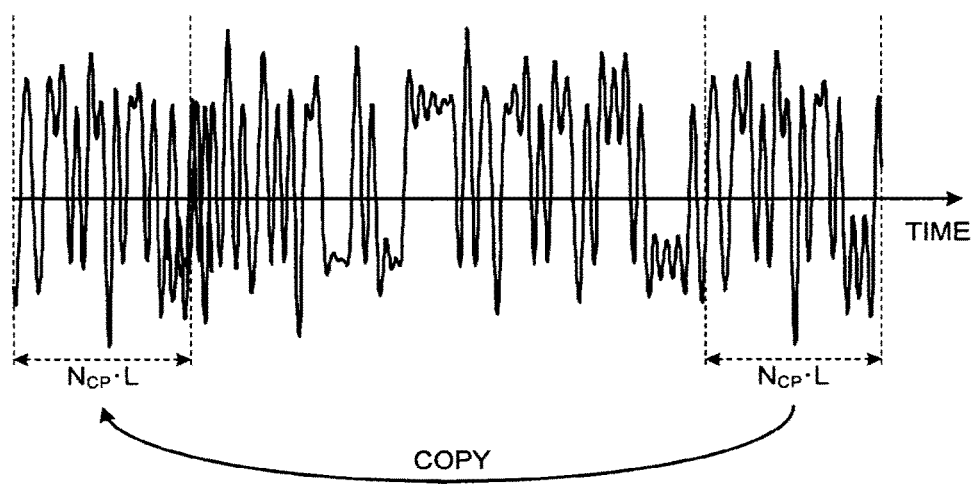
FIG. 3 is a diagram illustrating an example of CP insertion according to the first embodiment.

FIG. 3 is a diagram illustrating an example of CP insertion according to the present embodiment. The CP insertion unit 4 copies the latter $N_{CP}$ symbols of the input N symbols and inserts the copied symbols before the N symbols. In FIG. 3, the horizontal axis denotes time and L denotes the oversampling rate described later of the time domain signal output from the interpolation unit 3.

Figure 4:
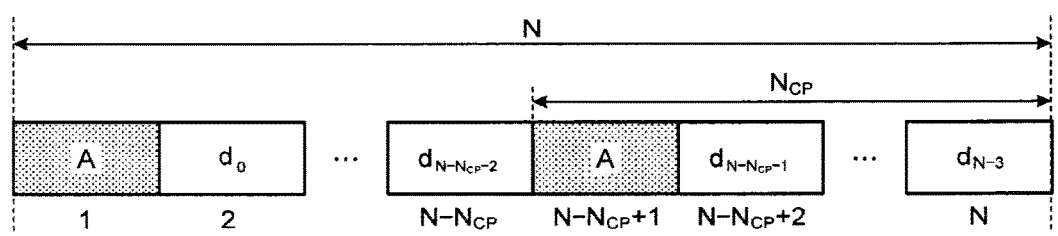
FIG. 4 is a diagram illustrating an arrangement example of fixed symbols A according to an embodiment.

The fixed-symbol arrangement unit 2 generates a fixed symbol A and inserts the fixed symbol A at a predetermined position between data symbols. FIG. 4 is a diagram illustrating an arrangement example of the fixed symbols A according to the present embodiment. In the example illustrated in FIG. 4, the fixed symbol A is inserted at the first and the (N−$N_{CP}$+1)th symbol positions of the data symbols in one block, designating x=2. In FIG. 4, dm indicates the m-th (m=0, 1, . . . , N-x-1) data symbol output from the data-symbol generation unit 1.

Figure 5:
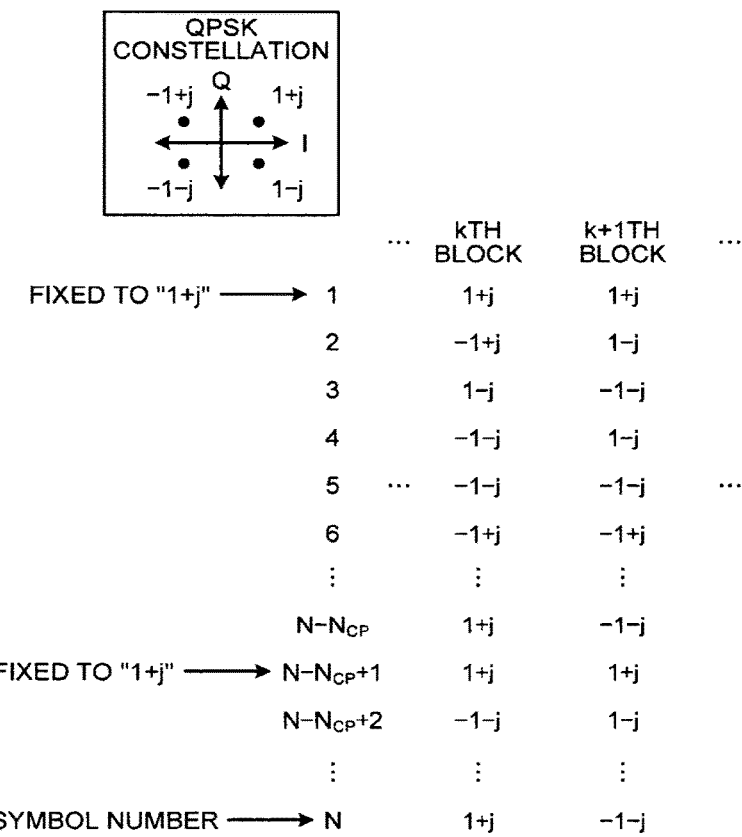
FIG. 5 is a diagram illustrating an example of a fixed symbol when a QPSK symbol is used as a data symbol.
Figure 6:
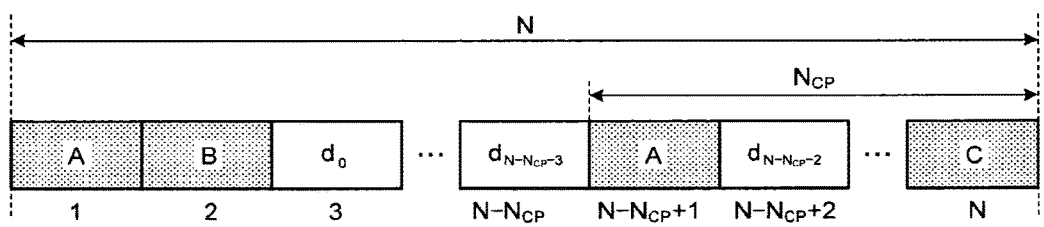
FIG. 6 is a diagram illustrating another example of the fixed symbol according to the first embodiment.

FIG. 5 is a diagram illustrating an example of the fixed symbol when a QPSK symbol is used as a data symbol. A data symbol is assigned to any of the four points illustrated as a QPSK constellation in FIG. 5 according to the information to be transmitted. As illustrated in FIG. 5, the first symbol and the (N−$N_{CE}$+1)th symbol become the fixed symbols and are fixed to 1+j. The same fixed symbols are arranged at the same positions in this manner with respect to all the blocks (or with respect to all the blocks in a certain period such as in one frame). There is no limitation on the fixed symbol and the fixed symbol is not limited to the example illustrated in FIG. 5. In the present embodiment, the fixed symbol indicates a symbol with the phase and amplitude being fixed; however, a symbol in a specific quadrant can be used. Further, in the examples illustrated in FIG. 4 and FIG. 5, it is assumed that two fixed symbols are inserted per block. However, the number of fixed symbols is not limited thereto, provided that the same fixed symbols or fixed symbols having the same or similar phases and amplitudes are arranged in the first symbol and the (N−$N_{CE}$+1)th symbol. FIG. 6 is a diagram illustrating another example of the fixed symbol according to the present embodiment. As illustrated in FIG. 6, a plurality of types of fixed symbols A, B, and C can be inserted therein. As illustrated in FIG. 6, by inserting the fixed symbol at the end of the block symbol, an effect of further suppressing the out-of-band spectrum can be acquired.

The interpolation unit 3 performs oversampling (processing to increase the sampling rate, that is, to reduce the sampling interval) by using a signal interpolation formula described, for example, in "B. Porat, "A Course in Digital Signal Processing", John Wiley and Sons Inc., 1997" (hereinafter, "Porat Literature"). Oversampling is performed such that sampling points per symbol becomes L with respect to the time domain signal input to the interpolation unit 3. That is, oversampling is performed such that the sampling rate becomes L times with respect to input. The oversampling rate is a value indicating how many times the sampling rate after oversampling is larger than the input sampling rate.

Specifically, for example, the interpolation unit 3 converts the input time domain signal to a frequency domain signal, performs zero insertion processing for inserting zero with respect to the frequency domain signal, and converts the frequency domain signal to the time domain signal again. In this manner, oversampling can be performed by using the zero insertion processing. Oversampling (interpolation processing) in the interpolation unit 3 can be performed by using other interpolation methods. A method of performing interpolation (oversampling) without changing the input time domain signal to the frequency domain signal once can be used.

The number of samples of the time domain signal output from the interpolation unit 3 becomes N·L, and the number of samples of the signal after CP insertion becomes (N+$N_{CP}$)·L.

Figure 7:
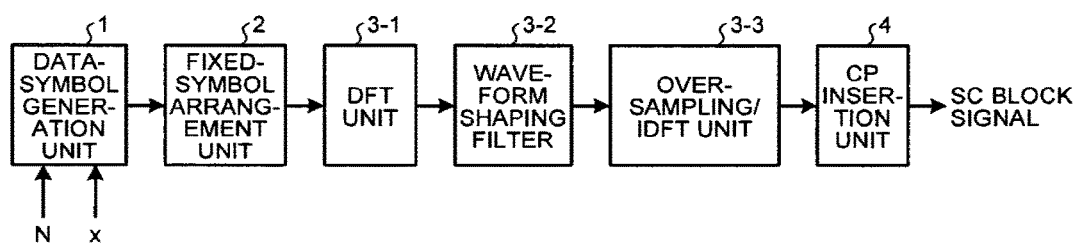
FIG. 7 is a diagram illustrating a configuration example of an interpolation unit according to the first embodiment.

FIG. 7 is a diagram illustrating a configuration example of the interpolation unit 3 according to the present embodiment. The data-symbol generation unit 1, the fixed-symbol arrangement unit 2, and the CP insertion unit 4 illustrated in FIG. 7 are similar to those in the configuration example illustrated in FIG. 1. FIG. 7 illustrates an example in which the interpolation unit 3 illustrated in FIG. 1 includes a DFT unit (Fourier transform unit) 3-1, a waveform shaping filter 3-2, and an oversampling/IDFT (Inverse DFT) unit (an inverse Fourier transform unit) 3-3.

The DFT unit 3-1 performs N-point DFT processing to convert the input time domain signal to a frequency domain signal. The waveform shaping filter 3-2 performs filtering processing to remove a signal other than signals in a desired frequency domain on the frequency domain signal. In the filtering processing, processing such as Nyquist filtering described in, for example, "T. S. Rappaport, "Wireless Communications", $2^{nd}$ edition, Prentice Hall PTR, 2002" can be used. The filtering processing is not limited thereto.

The oversampling/IDFT unit 3-3 increases the number of samples by zero insertion or the like with respect to the frequency domain signal having been subjected to the filtering processing (increases the number of samples to the number corresponding to the oversampling rate L), and thereafter, generates a time domain signal by performing the IDFT processing on the frequency domain signal. Instead of the oversampling/IDFT unit 3-3, an oversampling unit that performs oversampling and an IDFT unit that performs IDFT processing can be provided. Because the N-point DFT processing and L·N point IDFT processing are performed by using IFFT (Inverse Fast Fourier Transform) and FFT that require a low computation amount, it is desired that N is $2^P$ (P is an integer equal to or larger than 1) and L is an integer.

Thereafter, the CP insertion unit 4 inserts the CP in the time domain to generate an SC block signal. When the waveform shaping filter 3-2 does not change the number of samples of the signal, the number of samples of the signal after CP insertion becomes (N+$N_{CP}$)·L as in the configuration example illustrated in FIG. 1.

In the configuration example illustrated in FIG. 7, sample points interpolated between symbols are added by the oversampling/IDFT unit 3-3. However, due to circularity of an IDFT output described in the Porat Literature described above, an interpolated point added behind the last symbol becomes a point that interpolates between the last symbol and the first symbol. In the case of the example illustrated in FIG. 4, the first symbol is the fixed symbol A and the last sample output from the oversampling/IDFT unit 3-3 (the interpolated point) has a phase and an amplitude continuously connected to the phase and the amplitude of the fixed symbol A (a phase and an amplitude close to those of the fixed symbol A). In the case of the example illustrated in FIG. 4, the (N−$N_{CP}$+1)th symbol is also the fixed symbol A and thus the first symbol of the SC block to be output from the CP insertion unit 4 becomes the fixed symbol A. The arrangement of the fixed symbols is common to all the blocks; therefore, the phases and amplitudes of the last sample of the SC block and the first sample of the next SC block (a fixed symbol) are smoothly connected. Thus, continuity of the phase and amplitude between blocks can be maintained; therefore, suppression of the out-of-band spectrum can be achieved.

Figure 8:
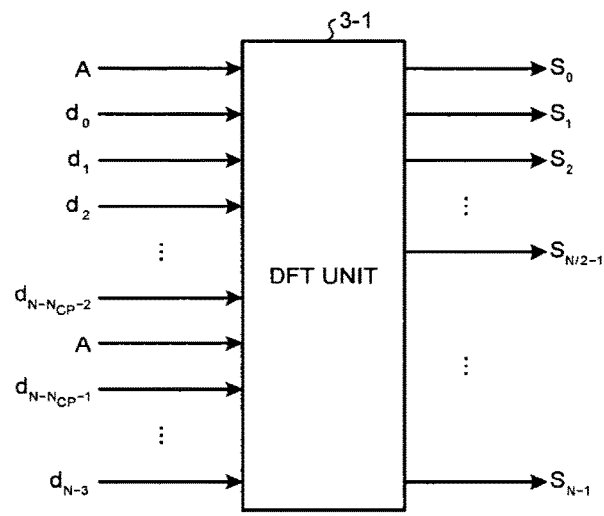
FIG. 8 is a diagram illustrating a relation between input and output of a DFT unit according to the first embodiment.
Figure 9:
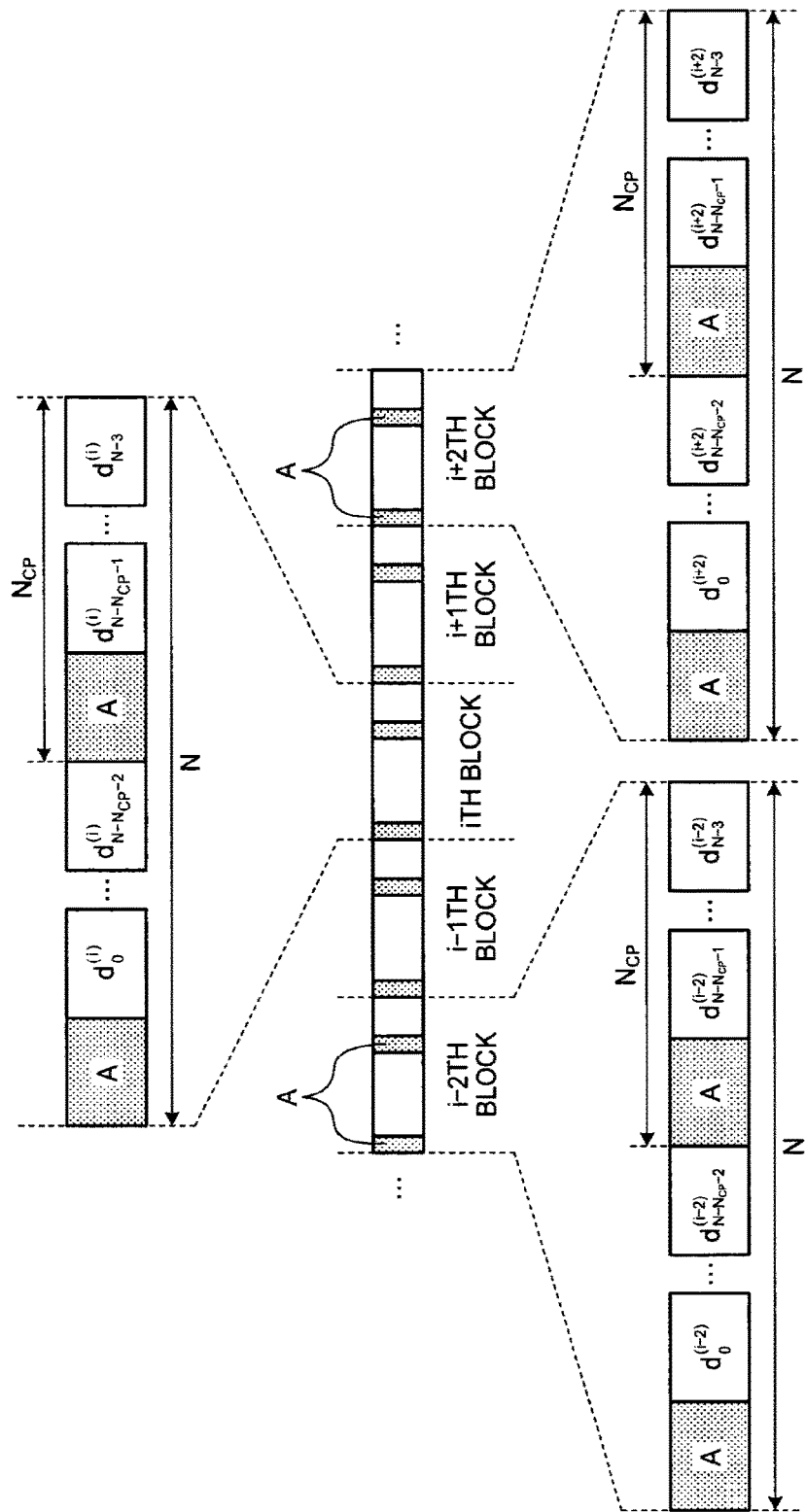
FIG. 9 is a diagram illustrating an example of fixed symbol arrangement according to the first embodiment.

FIG. 8 is a diagram illustrating a relation between input and output of the DFT unit 3-1. FIG. 8 illustrates an example of input and output signals to/from the DFT unit 3-1 in the case of the fixed symbol arrangement in FIG. 4. FIG. 9 is a diagram illustrating an example of the fixed symbol arrangement according to the present embodiment. In FIG. 9, it is assumed to be a case where the block has the fixed symbol arrangement in FIG. 4 and FIG. 9 illustrates that the symbol arrangement is applied to all the blocks. In FIG. 9, $dm^{(t)}$ denotes the m-th (m=0, 1, . . . , N−x−1) data symbol output from the data-symbol generation unit 1 as the t-th block.

Figure 10:
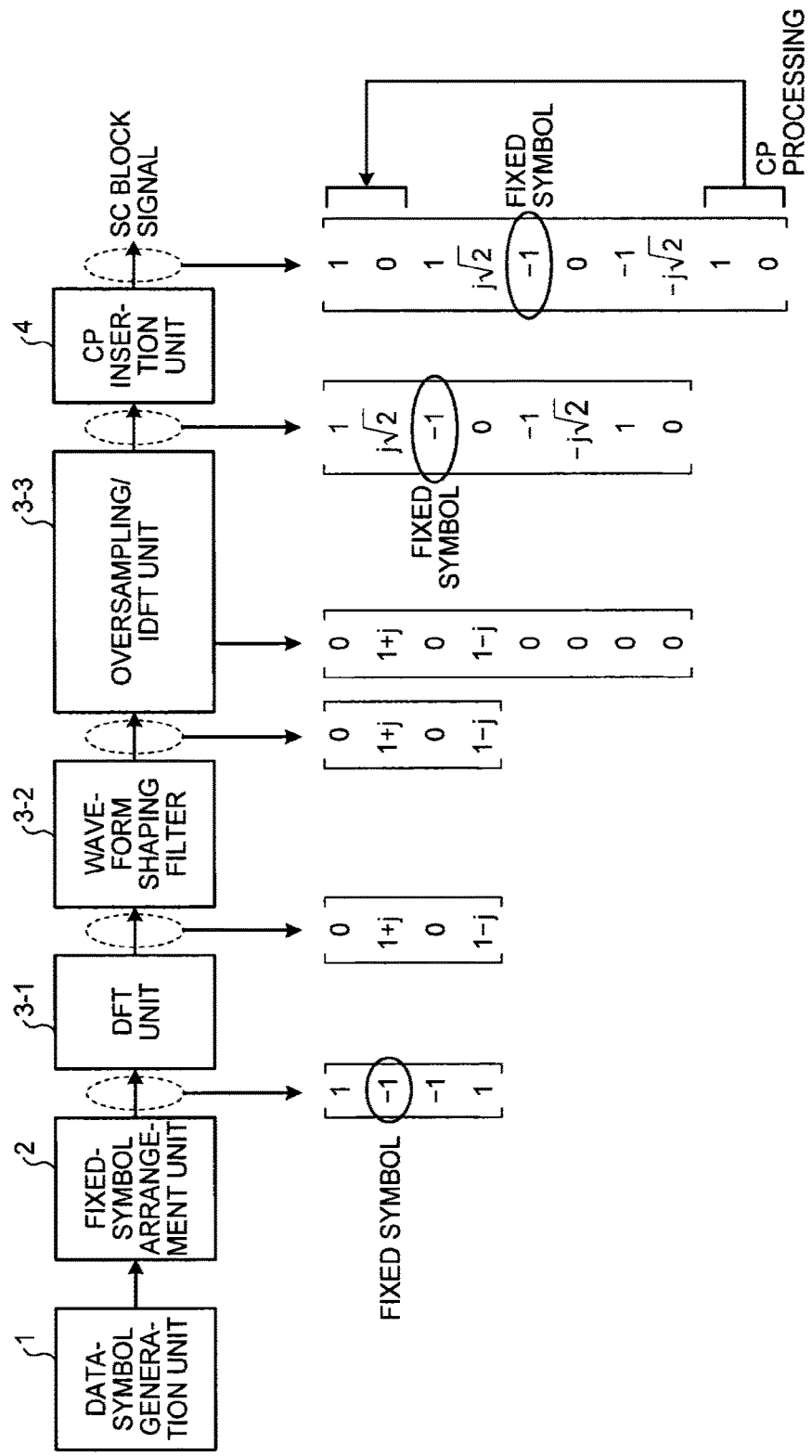
FIG. 10 is a diagram illustrating an output example of each unit when a fixed symbol is inserted between data symbols.

FIG. 10 is a diagram illustrating an output example of each unit when a fixed symbol is inserted between data symbols. FIG. 10 explains an interpolation operation in the configuration example illustrated in FIG. 7, and it is assumed that the number of fixed symbols is one for simplicity. FIG. 10 illustrates an example in which three data symbols are generated and the fixed-symbol arrangement unit 2 sets a fixed symbol "−1" to the second symbol. After the processing by the DFT unit 3-1, in this example, the waveform shaping filter 3-2 performs waveform shaping filtering by a Rectangular window. An oversampling signal having been subjected to zero insertion performed by the oversampling/IDFT unit 3-3 to have a double length of L is converted to a time domain signal by IDFT processing. The CP insertion unit 4 inserts the last two samples as the CP in this example.

From the specific example in FIG. 10, it is understood that the value of the fixed symbol arrangement before the DFT processing (the second symbol) matches the value of the symbol position after the IDFT output (the third sample in the double oversampled points), and an interpolated point is added between the data symbol of the first symbol before the DFT processing and the second symbol. Interpolation between the first symbol and the second symbol has been described here as an example; however, as described above, the interpolated point added after the last symbol interpolates between the last symbol and the first symbol because of the circularity of the IDFT output. Therefore, if the symbol arranged at the head of each block (that is, the first portion inserted as the CP) and the first symbol before the CP insertion are the same or similar, the continuity between the blocks can be maintained.

To improve the continuity of the phase and amplitude between blocks, phase rotation and amplitude adjustment can be applied to the fixed symbol in a block. Further, as the operation of the oversampling/IDFT unit 3-3, not only the operation example illustrated in FIG. 10 but also other zero insertion processing, signal substitution processing, or IDFT processing can be used. In the different zero insertion processing, signal substitution processing, or IDFT processing, phase rotation and amplitude adjustment can be applied to each fixed symbol in a block such that the phase continuity of the first and the last samples in the output signal of the oversampling/IDFT unit 3-3 is maintained and the desired fixed symbol is output to a designated position.

In the example illustrated in FIG. 4, the number of data symbols including fixed symbols is assumed to be N. However, if it is assumed that the number of data symbols including fixed symbols is $N_D$ and N is the number of symbols in one block, the present invention can be applied also to the case of $N_D<N$. For example, it is assumed that $N_D=6$ and $N=8$. To simplify the description, description of the oversampling will be omitted. It is assumed that the data signal input to the DFT unit 3-1 is represented by the following equation (1), a DFT-processed signal is represented by the following equation (2), and a zero-inserted DFT output signal is represented by the following equation (3).

$$d=[d_0,d_1,d_2,d_3,d_4,d_5]^T \quad (1)$$

$$s=[s_0,s_1,s_2,s_3,s_4,s_5]^T \quad (2)$$

$$s'=[0,s_0,s_1,s_2,s_3,s_4,s_5,0]^T \quad (3)$$

When s' represented by the equation (3) is input to the IDFT unit (the oversampling/IDFT unit 3-3), the output of the IDFT unit becomes as represented by the following equation (4), and the first and fifth signals become d0 and $d_3$ with $c_k$ (phase rotation and amplitude) being added by the DFT and IDFT processing.

$$y=[c_0d_0,y_1,y_2,y_3,c_4d_3,y_5,y_6,y_7]^T \quad (4)$$

In this case, if $d_0=f \cdot c_0^{-1}$, $d_3=f \cdot c_4^{-1}$, and the CP length is set to $N_{CP}=4$, then the head of the block symbol and the head of the CP become fixed symbols f. Generally, in the example illustrated in FIG. 7, if $0 \leq k \leq N_D/y-1$ when $x/N=y/N_D$ is satisfied, the (ky+1)th data signal $d_{ky+1}$ before input to the DFT unit, to which phase rotation and amplitude adjustment are applied, is output as the (kx+1)th signal of the output signal of the IDFT unit. By selecting an appropriate CP length, it is possible to design such that the head of the block symbol and the head of the CP become fixed symbols. As an example, it suffices that $d_0=f \cdot c_0^{-1}$, $d_{ky}=f \cdot c_{kx}^{-1}$, and $N_{CP}=N-kx$. When the oversampling is added, a fixed symbol can be set by the similar processing.

In the example illustrated in FIG. 7, interpolation using the circularity of the IDFT output is performed. However, when other interpolation methods are used, it suffices that interpolation is performed such that an interpolated point between the last symbol of each block and the first symbol after CP insertion is added as the last sample of the block.

As described above, according to the present embodiment, a fixed symbol is inserted at a fixed position between data blocks and interpolation is performed on the data after insertion of the fixed symbol such that the phase and amplitude do not become discontinuous between the last sample of each block and the first sample of each block after CP insertion. Thus, the continuity of the phase and amplitude between blocks can be maintained; therefore, the out-of-band spectrum can be suppressed.

Second Embodiment

Figure 11:
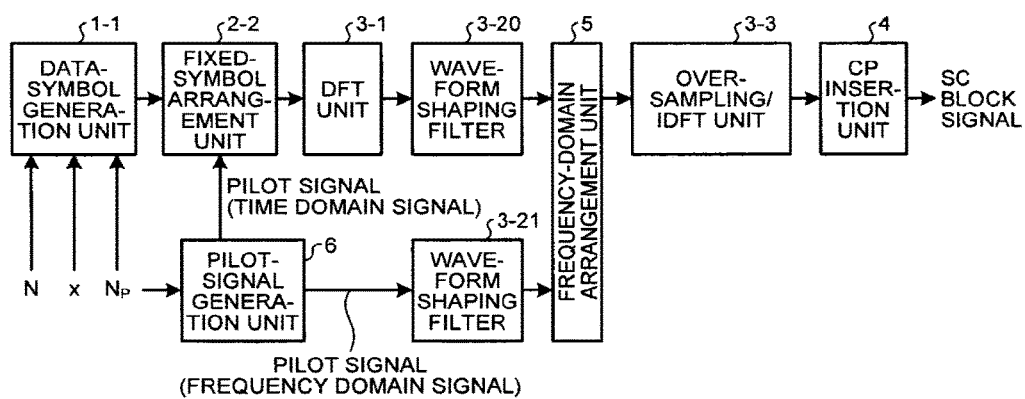
FIG. 11 is a diagram illustrating a functional configuration example of a transmission apparatus according to a second embodiment.

FIG. 11 is a diagram illustrating a functional configuration example of a transmission apparatus according to a second embodiment of the present invention. As illustrated in FIG. 11, the transmission apparatus according to the present embodiment includes a data-symbol generation unit 1-1, a fixed-symbol arrangement unit 2-2, the DFT unit 3-1, the oversampling/IDFT unit 3-3, a waveform shaping filter 3-20, a waveform shaping filter 3-21, a frequency-domain arrangement unit 5, a pilot-signal generation unit 6, and the CP insertion unit 4. Constituent elements having functions identical to those of the first embodiment are denoted by like reference signs as in the first embodiment, and redundant explanations thereof will be omitted. In the present embodiment, the oversampling/IDFT unit 3-3 functions as an interpolation unit.

In the SC block transmission, a pilot signal is used in some cases for estimation of a transmission line and synchronous processing, and in the frequency domain, pilot signals and DFT-processed data symbols are arranged. In the present embodiment, an example in which pilot signals are arranged in the frequency domain is described.

The pilot-signal generation unit 6 outputs a pilot signal as a frequency domain signal and the time domain signal of the pilot signal. The pilot signal as the frequency domain signal is input to the waveform shaping filter 3-21 and used for multiplexing. The pilot signal as the time domain signal including the waveform shaping processing in the time domain is input to the fixed-symbol arrangement unit 2-2 and used for calculating a fixed symbol.

The data-symbol generation unit 1-1 generates data symbols as in the data-symbol generation unit 1 according to the first embodiment. The number of data symbols to be generated per block is $N-x-N_P$ ($N_P$ is the number of pilot symbols per block).

The fixed-symbol arrangement unit 2-2 generates a fixed symbol on the basis of the pilot signals (pilot symbols) as the time domain signal and arranges the fixed symbol at a predetermined position between data symbols. The DFT unit 3-1 performs DFT processing on the symbols output from the fixed-symbol arrangement unit 2-2 to convert the symbols to a frequency domain signal, and inputs the frequency domain signal to the waveform shaping filter 3-20. The waveform shaping filter 3-20 performs waveform shaping in the frequency domain on the input from the DFT unit 3-1 and outputs the processed signal to the frequency-domain arrangement unit 5. Further, the waveform shaping filter 3-21 performs waveform shaping on the pilot signals as the frequency domain signal and outputs the processed signal to the frequency-domain arrangement unit 5.

The frequency-domain arrangement unit 5 arranges, in the frequency domain, the data symbols and the fixed symbol in the frequency domain output from the waveform shaping filter 3-20 and the pilot signals in the frequency domain output from the waveform shaping filter 3-21, and outputs them to the oversampling/IDFT unit 3-3.

The oversampling/IDFT unit 3-3 performs oversampling and IDFT processing on the signal output from the frequency-domain arrangement unit 5 as in the first embodiment and outputs the signal to the CP insertion unit 4. The CP insertion unit 4 performs CP insertion processing on the input signal as in the first embodiment.

Figure 12:
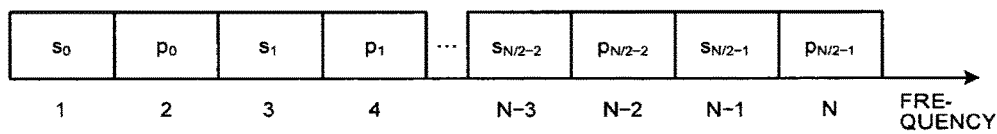
FIG. 12 is a diagram illustrating an arrangement example of data symbols (including fixed symbols) and pilot signals in a frequency domain.

As a specific example, it is assumed that the total number of symbols in one block is N, the number of symbols of the pilot signal in one block is $N_p=N/2$, and the number of data symbols (including fixed symbols) in one block is N/2. FIG. 12 is a diagram illustrating an arrangement example of data symbols (including fixed symbols) and pilot signals under the condition described above. In FIG. 12, $s_0, s_1, s_2, \ldots, s_{N/2-1}$ denote data symbols (including fixed symbols) in the frequency domain, and $p_0, p_1, p_2, \ldots, p_{N/2-1}$ denote pilot signals. In FIG. 12, there are alternate arrangements of the data symbols (including fixed symbols) and the pilot signals. FIG. 12 illustrates only an example, and the arrangement position and the number of pilot signals are not limited to the example illustrated in FIG. 12.

In the example illustrated in FIG. 12, because the pilot signals and the data symbols (including fixed symbols) are multiplexed in the frequency domain, when a fixed symbol at a predetermined position in the IDFT output (the time domain signal after the IDFT processing by the oversampling/IDFT unit 3-3) is set to A, the time domain signals of the pilot signals need to be taken into consideration. When it is assumed that the time domain signals of the pilot signals are $q_0, q_1, q_2, \ldots, q_{N/2-1}$, k' is a fixed symbol insertion position in the time domain, and $b_{k'}$ and $c_{k'}$ are phase rotation and amplitude adjustment performed such that the symbol at the predetermined position in the IDFT output becomes A, a fixed symbol $A_{k'}$ generated by the fixed-symbol arrangement unit 2-2 is obtained as $A_{k'}=c_{k'}A-b_{k'}q_{k'}$. The values of $b_{k'}$ and $c_{k'}$ are determined by the insertion positions of the pilot signals and the arrangement positions of the fixed symbols in the frequency domain. The time domain signals of the pilot signals are generated on the basis of the arrangement position of the pilot signals.

A specific example is described below. To simplify the description, it is assumed that the number of pilot symbols is $N_T=N/2$ and the number of data symbols is $N_D=N/2$. If it is assumed that the pilot symbol arranged in the frequency domain is represented by the following equation (5) and a DFT matrix is represented by the following equation (6), the pilot symbol in the time domain becomes as represented by the following equation (7).

$$p_z = [0, p_0, 0, p_1, 0, \ldots, 0, p_{N_T-1}]^T \tag{5}$$

$$[W_N]_{m,n} = \frac{e^{-j2\pi mn/N}}{\sqrt{N}}, \ 0 \le n \le N-1, \ 0 \le m \le N-1 \tag{6}$$

$$q = [q_1^T, -q_1^T]^T = W_N^H p_z \tag{7}$$

If it is assumed that the DFT-processed data signal, which is arranged in the frequency domain, is represented by the following equation (8), the time domain signal becomes as represented by the following equation (9). Further, $t_1$ indicated by the following equation (10) is a vector indicating $N_D$ data symbols. The following equation (11) is also established.

$$s_z = [s_0, 0, s_1, 0, s_2, 0, \ldots, 0, s_{N_D-1}, 0]^T \tag{8}$$

$$t = \left[\frac{t_1^T}{\sqrt{2}}, \frac{t_1^T}{\sqrt{2}}\right]^T = W_N^H s_z \tag{9}$$

$$t_1 = [d_0, d_1, \ldots, d_{N_D-1}]^T \tag{10}$$

$$s = [s_0, s_1, \ldots, s_{N_D-1}]^T = W_{N/2} t_1 \tag{11}$$

The pilot signal and the DFT-processed data signal multiplexed in the frequency domain become as represented by the following equation (12), and the time domain signal becomes as represented by the following equation (13).

$$r = p_z + s_z \tag{12}$$

$$y = W_N^H r = W_N^H (p_z + s_z) = t + q \tag{13}$$

In the time domain, when it is desired to set the fixed signal "A" as $y_1 = y_{N-NCP+1} = A$ in symbol times $n=1$ and $n=N-N_{CP|1}$, it suffices that symbols as represented by the following equations (14) and (15) are inserted into the data symbols.

$$t_{1,1} = A_1' = \sqrt{2} \cdot A - \sqrt{2} \cdot q_{1,1} \tag{14}$$

$$t_{1,N/2-N_{CP}+1} = A_{N/2-N_{CP}+1}' = \sqrt{2} \cdot A + \sqrt{2} \cdot q_{1,N/2-N_{CP}+1} \tag{15}$$

Furthermore, if it is assumed that $e_{k'}$ is a constant and $g_{k'}$ is a coefficient depending on other data symbols, a fixed-symbol calculation method in which other data is taken into consideration such as $A_{k'}=c_{k'}A-b_{k'}q_{k'}+e_{k'}g_{k'}$ can be used. A specific example is described below. If it is assumed that $K=N/N_T$, the position of the pilot signal in the block signal is $I_T=\{K, 2K, 3K, \ldots, N_T K\}$, and the DFT-processed data symbol is present in other places.

The data symbol and the pilot symbol in the time domain are respectively represented by the following equations (16) and (17).

$$y_D = W_N^H P_D W_{N_D} d \tag{16}$$

$$y_T = W_N^H P_T p \tag{17}$$

If it is assumed that $I_D$ and $I_T$ are respectively positions of the DFT-processed data symbol and the pilot symbol in the frequency domain, in the above equations, the arrangement matrix becomes as represented by the following equations (18) and (19).

$$[P_D]_{m,n} = \begin{cases} 1 & m \in I_D, n = m - \lfloor m/K \rfloor \\ 0 & \text{otherwise} \end{cases} \tag{18}$$

$$[P_T]_{m,n} = \begin{cases} 1 & m \in I_T, n = m/K \\ 0 & \text{otherwise} \end{cases} \tag{19}$$

When it is desired to set the K=1th and k=(N−$N_{CP}$+1)th symbols of the output signal as "A", the pilot signal and an interference wave need to be considered. To simplify signage, in the case of the following equation (20), if it is desired to set the K=1th data symbol as "A", for example, the first data symbol is set as represented by the following equation (21), assuming that $[v]_m$ is the m-th element of a vector v.

$$A = W_N^H P_D W_{N_D} \quad (20)$$

$$d_1 = A - [y_T]_1 \quad (21)$$

If it is assumed that $[A]_{m,n}$ is the (m, n)th element of a matrix A, when it is desired to set the $k=(N-N_{CP}+1)$th symbol as "A", the n-th signal at an arbitrary position is obtained by solving the following equation (22).

$$A = [A]_{N-N_{CP}+1,n} d_n + \sum_{\substack{i=1 \\ i \neq n}}^{N} [A]_{N-N_{CP}+1,i} d_{i-1} + [y_T]_{N-N_{CP}+1} \quad (22)$$

As a result, by setting the value as represented by the following equation (23), the $k=(N-N_{CP}+1)$th symbol becomes "A".

$$d_n = \frac{\left(A - \sum_{\substack{i=1 \\ i \neq n}}^{N} [A]_{N-N_{CP}+1,i} d_i - [y_T]_{N-N_{CP}+1}\right)}{[A]_{N-N_{CP}+1,n}} \quad (23)$$

In the above example, it is assumed that $N_D+N_T=N$. However, in the case of $N_D+N_T<N$, it suffices that a fixed signal that takes the time domain pilot signal into consideration is input by using the same designing method as in the first embodiment.

It is assumed that the pilot and the DFT-processed data symbol in the frequency domain are represented by the following equation (24) and the DFT-processed signal is represented by the following equation (25) in the case where $N_D=N_T$. If it is assumed that $0_N$ is a vector established by N zeroes, the arrangement of the pilot signal and the data symbol in the frequency domain become as represented by the following equations (26) and (27).

$$d = [d_0, d_1, \ldots, d_{N_D-1}]^T \quad (24)$$

$$s = [s_0, s_1, \ldots, s_{N_D-1}]^T \quad (25)$$

$$p_z = [0_{(N-N_T-N_D)/2}^T, 0, p_0, 0, p_1, 0, \ldots, 0, p_{N_T-1}, 0_{(N-N_T-N_D)/2}^T]^T \quad (26)$$

$$s_z = [0_{(N-N_T-N_D)/2}^T, s_0, 0, s_1, 0, \ldots, 0, s_{N_D-1}, 0, 0_{(N-N_T-N_D)/2}^T]^T \quad (27)$$

The time domain signal becomes as represented by the following equation (28), and the pilot symbol in the time domain becomes as represented by the following equation (29). The pilot signal and the DFT-processed data signal multiplexed in the frequency domain become as represented by the following equation (30), and the time domain signal becomes as represented by the following equation (31).

$$t = [t_s^T, t_s^T]^T = W_N^H s_z \quad (28)$$

$$q = [q_s^T, -q_s^T]^T = W_N^H p_z \quad (29)$$

$$r = p_z + s_z \quad (30)$$

$$y = W_N^H r = W_N^H (p_z + s_z) = t + q \quad (31)$$

In the example illustrated in FIG. 11, if $0 \leq k \leq (N_D+N_T)/y-1$ when $x/N = y/(N_D+N_T)$ is satisfied, as the $(kx+1)$th signal of the output signal of the IDFT unit, the $(ky+1)$th data signal before input to the DFT unit, to which phase rotation and amplitude adjustment are applied, and $q_{kx+1}$ are output, and if $ky \geq N_D$, the $(ky+1-N_D)$th data signal and $q_{kx+1}$ are output.

In the time domain, when it is desired to set the fixed symbol "A" as $y_1 = t_{kx+1} = A$ in symbol times $n=1$ and $n=kx+1$, it suffices that the following symbols are inserted into the data symbols. If it is assumed that $ky \geq N_D$, the first data symbol and the $(ky+1-N_D)$th data symbol are set as represented by the following equations (32) and (33). Complex numbers $c_1$ and $b_1$ depend on the values of N, $N_D$, and $N_T$, and the processing in the IDFT unit 3-3. If $N_{CP} = N - kx$, it is possible to design such that the head of the CP becomes the fixed symbol.

$$d_1 = A_1' = c_1 A - b_1 g_1 \quad (32)$$

$$d_{ky-N_D+1} = A_{ky-N_D+1}' = c_{ky-N_D+1} A - b_{kx+1} q_{kx+1} \quad (33)$$

In the present embodiment, because the pilot signal are inserted, the value of the fixed symbol $A_k'$ changes according to the insertion positions of the pilot signal and the fixed symbol. Therefore, the processing described above is performed for each block. However, if the insertion positions of the pilot signal and the fixed symbol are fixed between the blocks, it is possible to obtain $A_k'$ once and thereafter use $A_k'$ that is already obtained.

Figure 13:
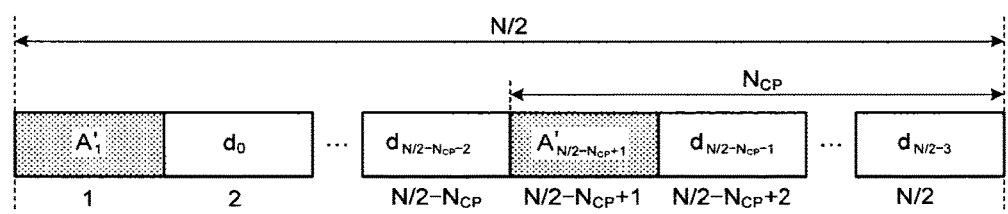
FIG. 13 is a diagram illustrating a specific arrangement example of data symbols and fixed symbols in a time domain.

FIG. 13 is a diagram illustrating a specific arrangement example of data symbols and fixed symbols in the time domain, when the number of symbols of the pilot signal is N/2. The fixed-symbol arrangement unit 2-2 arranges the fixed symbols, for example, as illustrated in FIG. 13.

Figure 14:
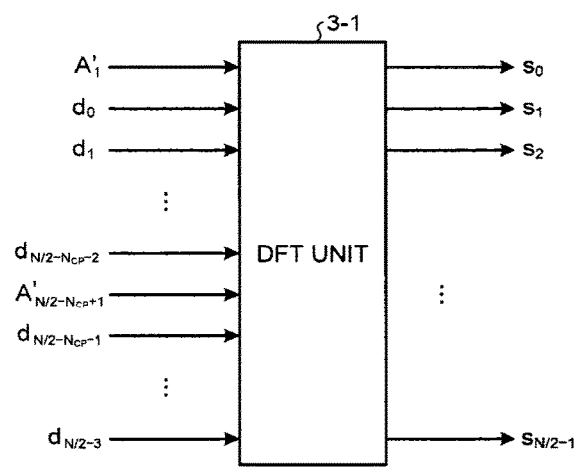
FIG. 14 is a diagram illustrating an example of a relation between input and output of a DFT unit according to the second embodiment.
Figure 15:
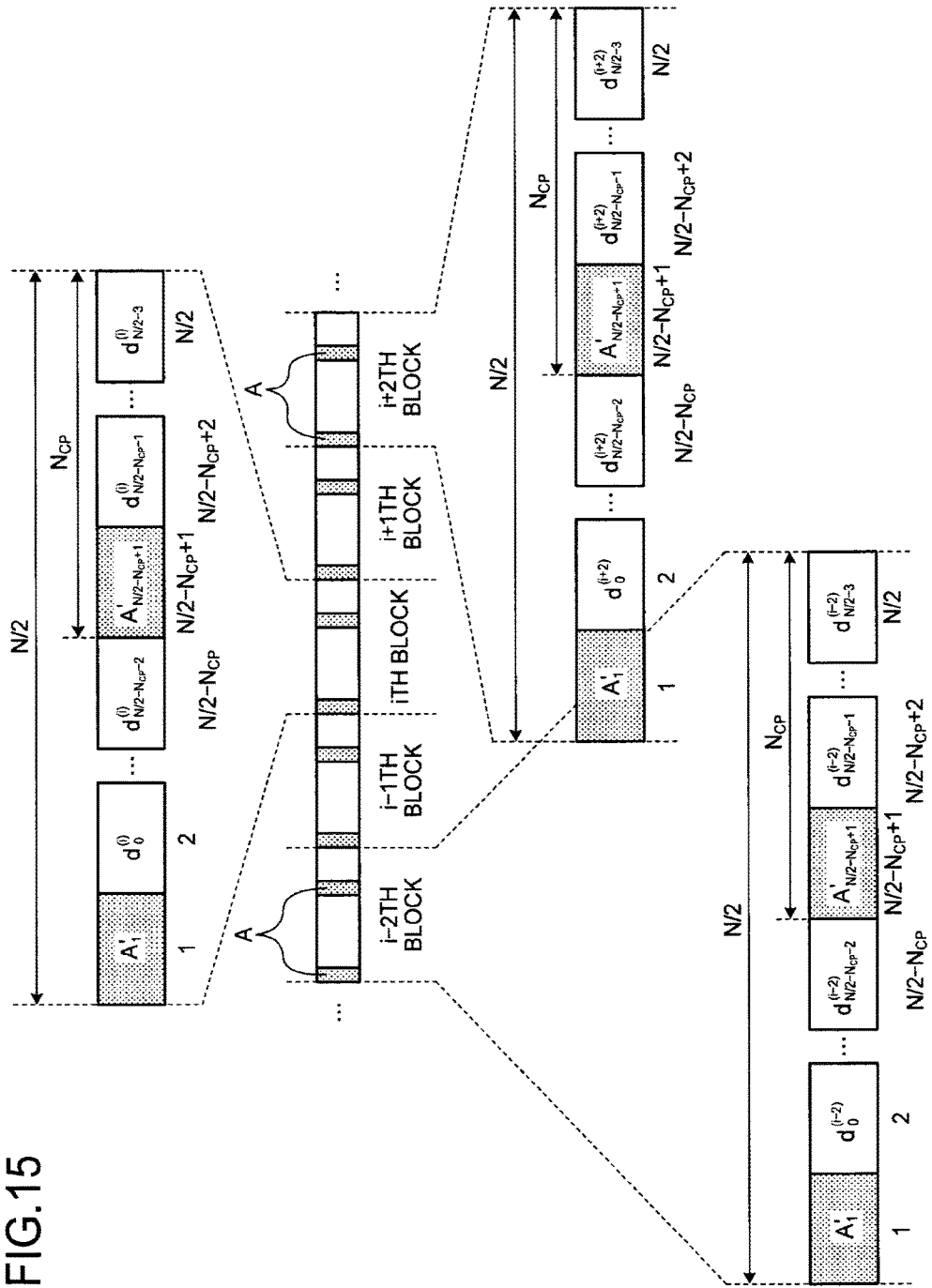
FIG. 15 is a diagram illustrating an example of arrangement of fixed symbols according to the second embodiment.

FIG. 14 is a diagram illustrating an example of a relation between input and output of the DFT unit 3-1 according to the present embodiment. FIG. 15 is a diagram illustrating an example of the arrangement of fixed symbols according to the present embodiment. In FIG. 15, it is assumed to be a case where the block has the fixed symbol arrangement in FIG. 13 and FIG. 15 illustrates that the symbol arrangement is applied to all the blocks. As described in the first embodiment, in order to maintain the continuity of the phase and amplitude between blocks, phase rotation and a fixed signal can be applied to the fixed signal.

Figure 16:
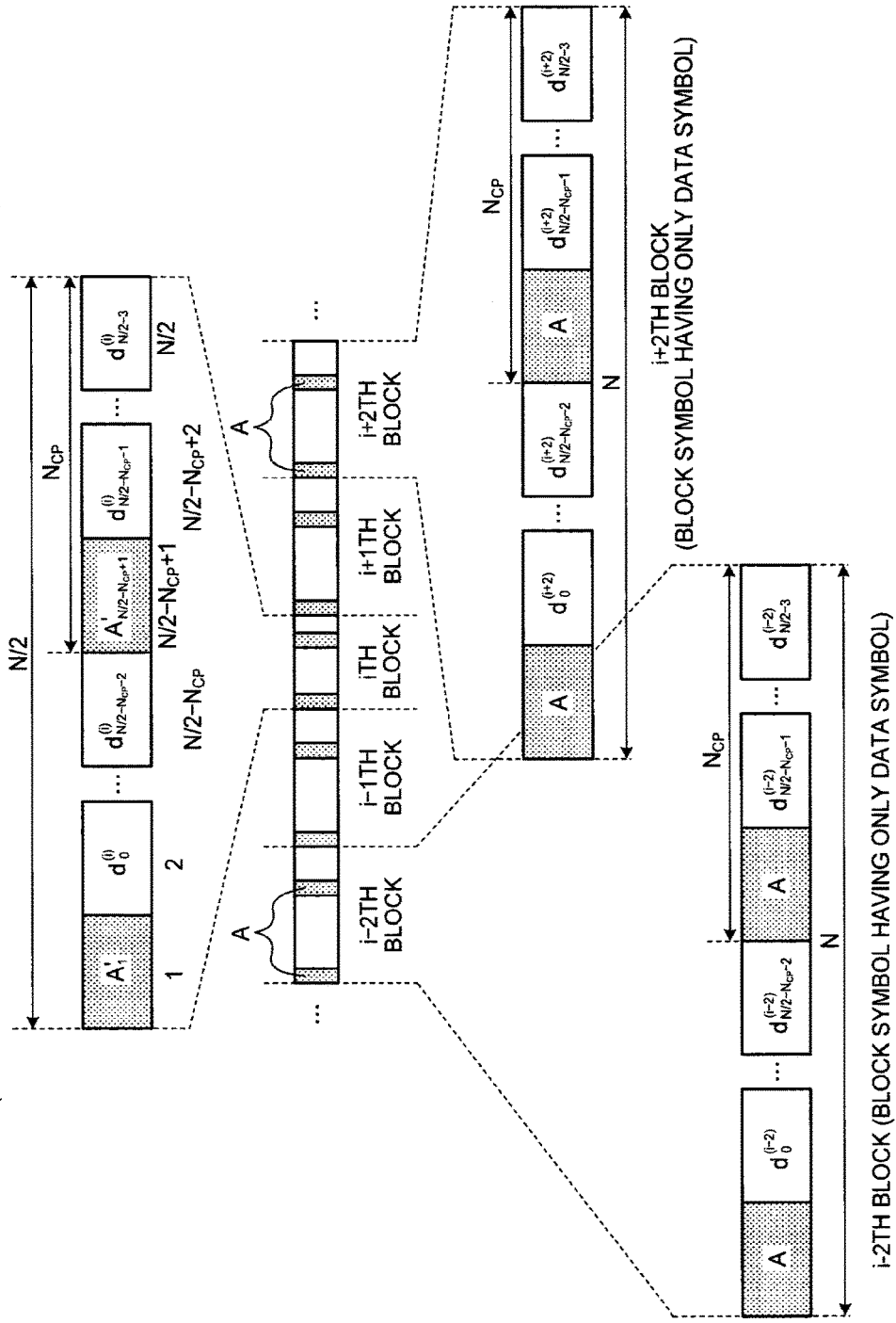
FIG. 16 is a diagram illustrating an example of arrangement of fixed symbols when a block including a pilot signal and a block not including the pilot signal are mixed.

An example of not including the pilot signal has been described in the first embodiment, and an example of including the pilot signal has been described in the present embodiment. However, the configuration can be such that a block including the pilot signal and a block not including the pilot signal are mixed. Even if these blocks are mixed, if it is set such that the fixed symbol is arranged at the same position in the time domain, discontinuity of the phase and amplitude between blocks can be prevented in a similar manner; therefore, an effect of suppressing the out-of-band spectrum can be acquired. FIG. 16 is a diagram illustrating an example of the arrangement of fixed symbols when a block including the pilot signal and a block not including the pilot signal are mixed. In this case, in the configuration of the transmission apparatus illustrated in FIG. 11, the data-symbol generation unit 1-1 and the fixed-symbol arrangement unit 2-2 have functions as the data-symbol generation unit 1 and the fixed-symbol arrangement unit 2 according to the first embodiment. When a block that does not include the pilot signal is to be generated, the data-symbol generation unit 1-1 and the fixed-symbol arrangement unit 2-2 only need to function as in the first embodiment. Further, when a block that does not include the pilot signal is to be generated, the frequency-domain arrangement unit 5 only needs to output the data symbol and the fixed symbol in the frequency domain output from the waveform shaping filter 3-20 directly to the oversampling/IDFT unit 3-3.

Figure 17:
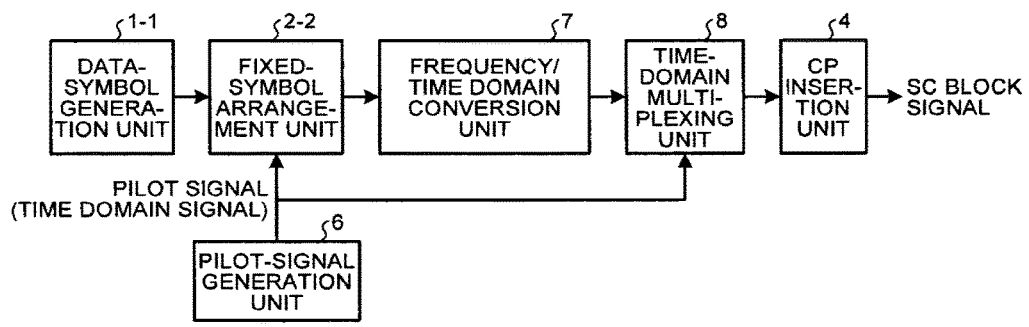
FIG. 17 is a diagram illustrating a configuration example of a transmission apparatus when pilot signals are multiplexed in a time domain.

In the present embodiment, an example of multiplexing the pilot signals in the frequency domain has been described. However, the pilot signals can be multiplexed in the time domain. FIG. 17 is a diagram illustrating a configuration example of the transmission apparatus when the pilot signals are multiplexed in the time domain. In the configuration example illustrated in FIG. 17, the pilot-signal generation unit 6 generates the pilot signals as the time domain signal and inputs the pilot signals to the fixed-symbol arrangement unit 2-2 as in the configuration example illustrated in FIG. 11. The fixed-symbol arrangement unit 2-2 arranges the fixed symbols as in the configuration example illustrated in FIG. 11 and outputs the data symbols and the fixed symbols to a frequency/time domain conversion unit 7. The frequency/time domain conversion unit 7 converts the input symbols to a frequency domain as in the first embodiment, and converts it to a time domain signal again after the oversampling. A time-domain multiplexing unit 8 multiplexes the output from the frequency/time domain conversion unit 7 and the pilot signals as the time domain signal and inputs the multiplexed signal to the CP insertion unit 4. The time-domain multiplexing unit 8 can obtain a multiplexed signal $y_k$ in the time domain as $y_k = s_k + q_k$, for example, assuming that $s_k$ is a time domain signal output from the frequency/time domain conversion unit 7 and $q_k$ is a pilot signal in the time domain.

As described above, according to the present embodiment, when the pilot signal is multiplexed and transmitted, the fixed-symbol arrangement unit 2-2 calculates the fixed symbol such that the fixed symbol multiplexed with the pilot signal has a predetermined value at a predetermined position, on the basis of the arrangement position of the pilot signal. Accordingly, even if the pilot signal is multiplexed, the continuity of the phase and amplitude between blocks can be maintained; therefore, the out-of-band spectrum can be suppressed.

Third Embodiment

Figure 18:
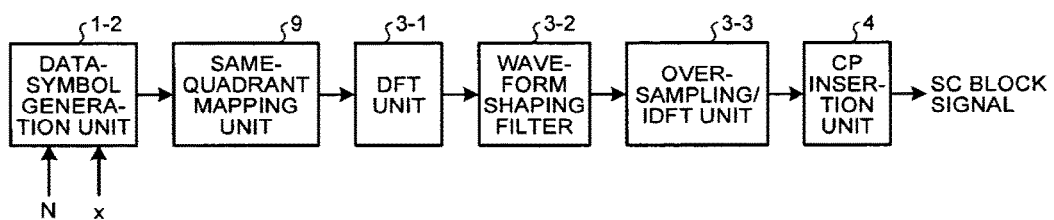
FIG. 18 is a diagram illustrating a functional configuration example of a transmission apparatus according to a third embodiment.

FIG. 18 is a diagram illustrating a functional configuration example of a transmission apparatus according to a third embodiment of the present invention. As illustrated in FIG. 18, the transmission apparatus according to the present embodiment has the same configuration as that of the configuration example illustrated in FIG. 7 of the first embodiment, except that the transmission apparatus includes a data-symbol generation unit 1-2 instead of the data-symbol generation unit 1 and a same-quadrant mapping unit (symbol arrangement unit) 9 instead of the fixed-symbol arrangement unit 2. Constituent elements having functions identical to those of the first embodiment are denoted by like reference signs in the first embodiment, and redundant explanations thereof will be omitted.

In the first and second embodiments, an example in which a fixed symbol is arranged at a predetermined position has been described. In the present embodiment, a symbol that becomes a signal point in the same quadrant (hereinafter, "same-quadrant symbol") is arranged instead of the fixed symbol in a complex plane (an IQ plane).

The data-symbol generation unit 1-2 generates N data symbols per block. However, x symbols to be used as the same-quadrant symbols among the N data symbols are assigned with data having the number of bits less than that of normal data symbols (corresponding to low-order data bits described later). The data-symbol generation unit 1-2 generates the same-quadrant symbols by performing mapping such that the same-quadrant symbols of the N data symbols are in the same quadrant. The same-quadrant mapping unit 9 arranges the same-quadrant symbols at predetermined positions in a similar manner to the fixed symbols of the first embodiment to generate a block symbol (symbols for one block consisting of data symbols and same-quadrant symbols). Mapping of the same-quadrant symbols (generation of the same-quadrant symbols) can be performed by the same-quadrant mapping unit 9 by acquiring data bits from the data-symbol generation unit 1-2.

Figure 19:
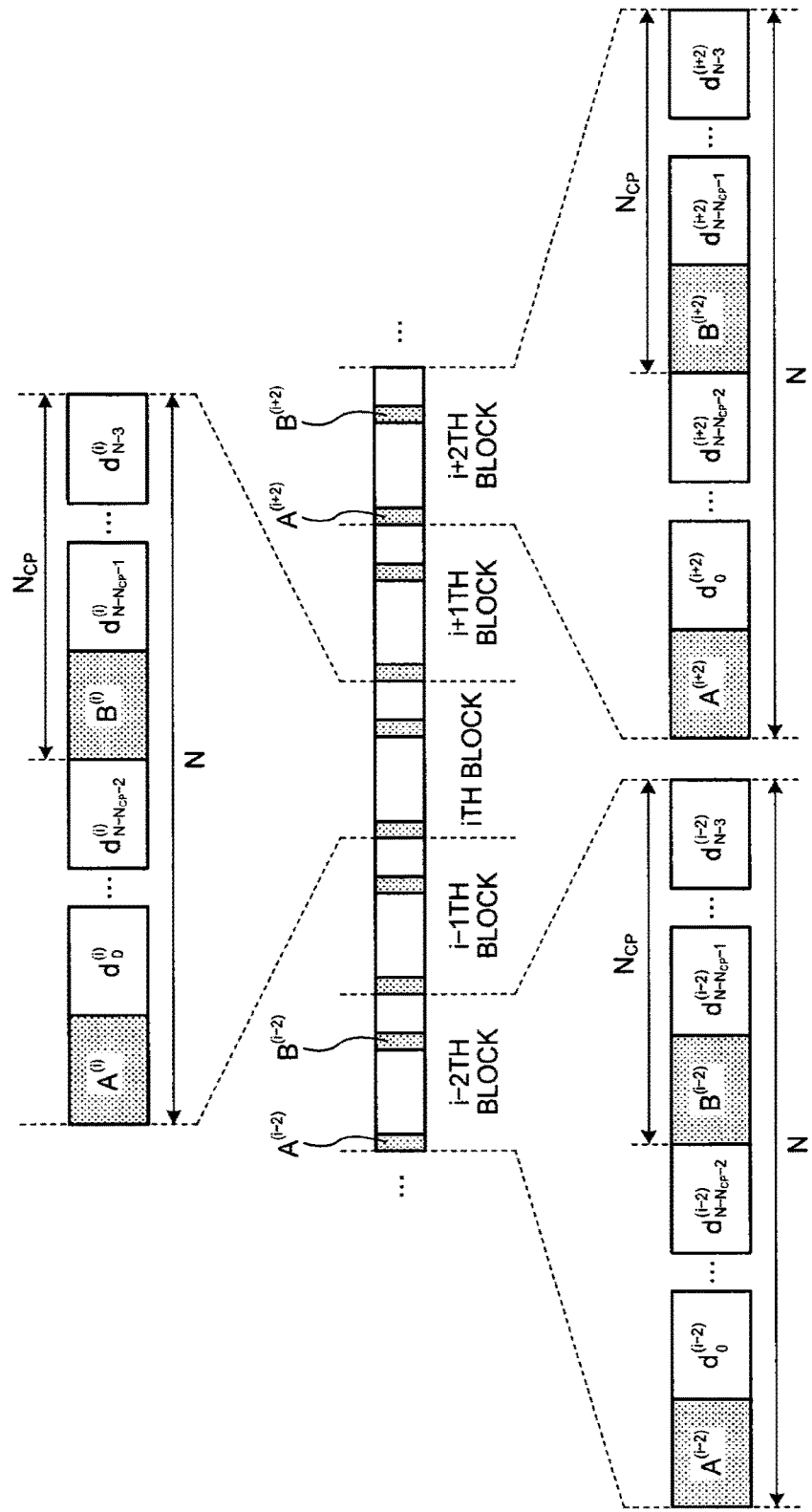
FIG. 19 is a diagram illustrating an example of same quadrant mapping according to the third embodiment.

FIG. 19 is a diagram illustrating an example of the same quadrant mapping according to the present embodiment. In FIG. 19, to simplify the description, an example is illustrated in which two symbols are set as the same-quadrant symbols, assuming that x=2. In the present embodiment, the first symbol $A^{(i)}$ and the $(N-N_{CP}+1)$th symbol $B^{(i)}$ are not always the same symbols, but $A^{(i)}$ and $B^{(i)}$ are mapped so as to be in the same quadrant. Further, $A^{(i)}$ and $B^{(i)}$ are not always the same between the blocks, but $A^{(i)}$ and $B^{(i)}$ are mapped so as to be in the same quadrant. In the case of the fixed symbol, data bits are not included. However, in the present embodiment, the same-quadrant symbol can include data bits, thereby enabling data loss to be minimized.

Figure 20:
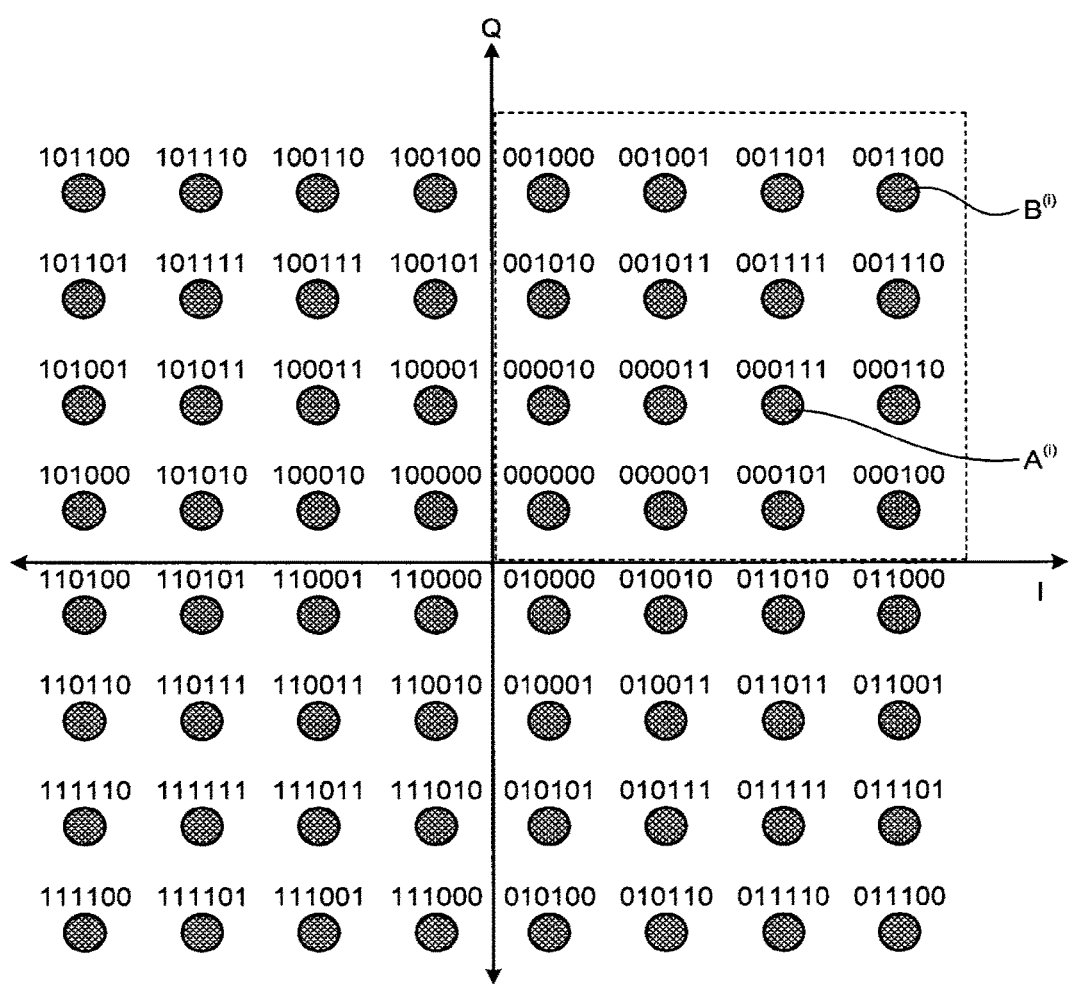
FIG. 20 is a diagram illustrating an example of same quadrant mapping in the case of 64QAM.

FIG. 20 is a diagram illustrating an example of the same quadrant mapping in the case of 64 QAM. FIG. 20 illustrates a 64 QAM constellation and 6-bit values mapped at respective points. For example, as illustrated in FIG. 20, it suffices that mapping is performed by selecting $A^{(i)}$ and $B^{(i)}$ from the upper right quadrant. Specifically, the first two bits of $A^{(i)}$ and $B^{(i)}$ are fixed to "00" and the remaining low-order four bits take arbitrary values. Accordingly, the low-order four bits of $A^{(i)}$ and $B^{(i)}$ can be used as data bits. Mapping is then performed on all the blocks such that the high-order two bits of $A^{(i)}$ and $B^{(i)}$ become "00". FIG. 20 illustrates an example in which $A^{(i)}$ and $B^{(i)}$ are mapped in the upper right quadrant. However, the present invention is not limited thereto and mapping can be performed in any quadrant of lower right, upper left, and lower left quadrants.

FIG. 21 is a diagram illustrating an example of symbol values when 64QAM same quadrant mapping is performed. The high-order two bits of the first symbol and the $(N-N_{CP}+1)$th symbol are fixed to "11". Similarly, in all the blocks, processing of fixing the high-order two bits of the first symbol and the $(N-N_{CP}+1)$th symbol to "11" is performed. In the example illustrated in FIG. 21, the number of data bits per block becomes 6 N-4 bits.

Figure 22:
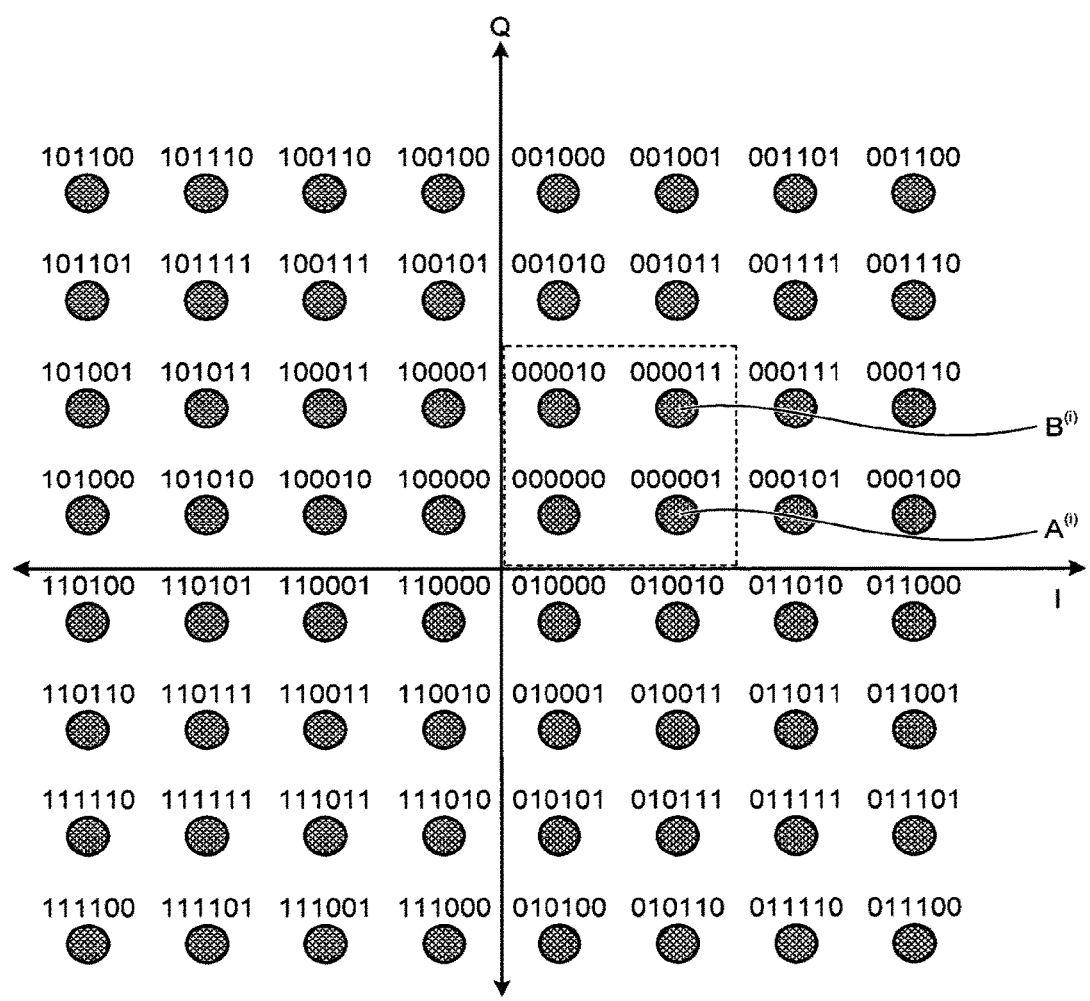
FIG. 22 is a diagram illustrating an example in which $A^{(i)}$ and $B^{(i)}$ are mapped in a predetermined range of one quadrant.

As the quadrant range becomes smaller, the out-of-band spectrum decreases. Therefore, $A^{(i)}$ and $B^{(i)}$ can be mapped not in any of the four quadrants, but in a narrower predetermined range. FIG. 22 is a diagram illustrating an example in which $A^{(i)}$ and $B^{(i)}$ are mapped in a predetermined range of one quadrant. In the example illustrated in FIG. 22, $A^{(i)}$ and $B^{(i)}$ are mapped within a range including four signal points surrounded by a dotted line. That is, mapping only needs to be performed such that the high-order four bits of $A^{(i)}$ and $B^{(i)}$ become "0000", and the low-order two bits become data bits. To simplify the description, 64 QAM has been used for the description; however, any modulation method can be used. Further, even when the pilot symbol is inserted, as in the second embodiment, if it is assumed that k' is an insertion position of the same-quadrant symbol, it suffices that a symbol is formed such that $A^{(i)}$ becomes the same-quadrant symbol, assuming that $A_{k'}^{(i)'} = c_k A^{(i)} - b_k q_{k'}$, while taking the pilot component into consideration. Operations of the present embodiment other than those described above are identical to those of the first embodiment.

The fixed symbol in the first embodiment is one of the same-quadrant symbols and can be considered as an example in which the above predetermined range is narrowed such that only one signal point is included in a predetermined range.

In the above example, two symbols are the same-quadrant symbols in a block; however, three or more symbols can be set as the same-quadrant symbols. Further, phase rotation and amplitude adjustment can be performed on $A^{(i)}$ and $B^{(i)}$ so that the out-of-band spectrum decreases.

As described above, according to the present embodiment, symbols within the same quadrant or a certain range (symbols in which a part of bit values of all the bits of the symbol is set to a fixed value) are used instead of the fixed symbol, to perform interpolation as in the first embodiment. Thus, the continuity of the phase and amplitude between blocks can be maintained; therefore, the out-of-band spectrum can be suppressed and data loss can be reduced.

Fourth Embodiment

Figure 23:
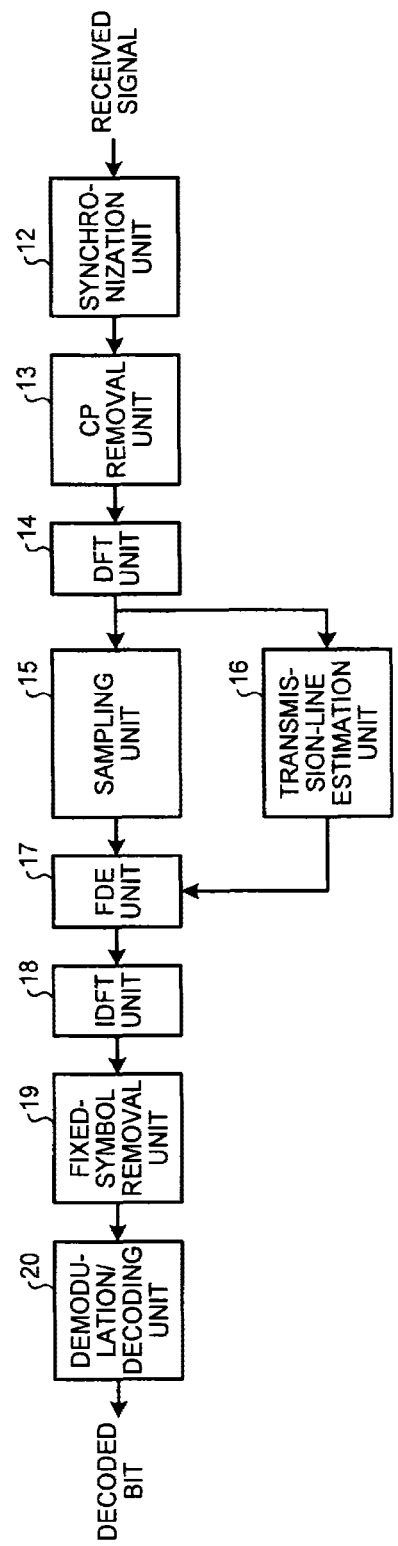
FIG. 23 is a diagram illustrating a functional configuration example of a reception apparatus according to a fourth embodiment.

FIG. 23 is a diagram illustrating a functional configuration example of a reception apparatus according to a fourth embodiment of the present invention. The reception apparatus according to the present embodiment receives an SC block signal transmitted by the transmission apparatus described in the first and second embodiments.

The reception apparatus according to the present embodiment is such that a synchronization unit 12 performs synchronous processing such as frame synchronization, frequency synchronization, and symbol synchronization on a received signal (an SC block signal). A CP removal unit 13 performs CP removal on the received signal after the synchronous processing. A DFT unit 14 performs DFT processing on the CP-removed received signal. A transmission-line estimation unit 16 performs estimation of a transmission line in accordance with the DFT-processed signal. A sampling unit 15 performs downsampling on the DFT-processed signal. An FDE unit (equalization unit) 17 performs FDE (Frequency Domain Equalizer: frequency domain equalization) processing on the basis of the downsampled signal and the estimation result of the transmission line. An IDFT unit 18 performs IDFT processing on the FDE-processed signal. A fixed-symbol removal unit 19 removes a fixed symbol from the IDFT-processed signal. A demodulation/decoding unit 20 performs demodulation and decoding processing on the signal after the fixed symbol has been removed.

Figure 24:
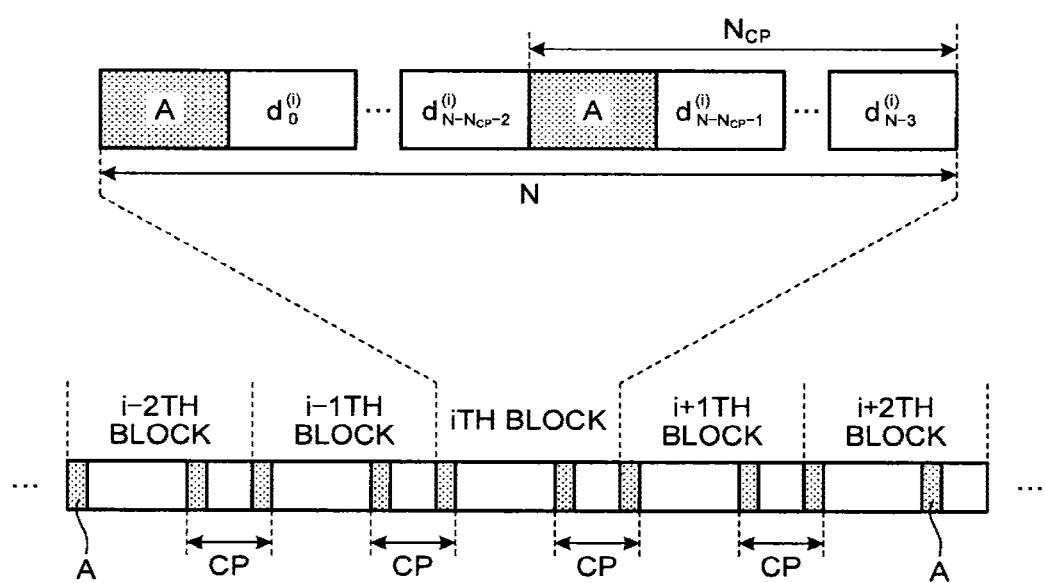
FIG. 24 is a diagram illustrating an example in which a first symbol of the next block is used as a CP.

When the first symbol of a block is set as a fixed signal, the length of the CP increases by one symbol by using the first fixed symbol of the next block; therefore, the characteristics with respect to multipath phasing improve. Therefore, the CP removal unit 13 can use one additional symbol as the CP to remove the CP portion. FIG. 24 is a diagram illustrating an example in which the first symbol of the next block is used as the CP.

As described above, in the present embodiment, the reception apparatus that receives the SC block signal transmitted by the transmission apparatus described in the first and second embodiments has been described. The reception apparatus performs demodulation and decoding on the received signal after downsampling and removal of the fixed symbol have been performed. Accordingly, it is possible to perform demodulation and decoding processing on the signal that is transmitted after the fixed symbol is inserted thereinto and interpolation processing is performed thereon.

Fifth Embodiment

Figure 25:
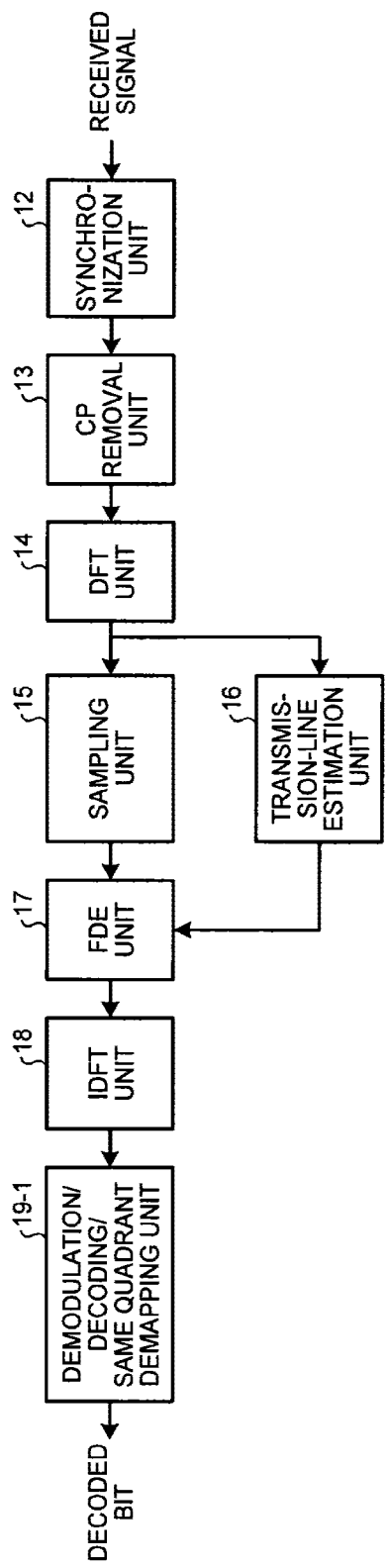
FIG. 25 is a diagram illustrating a functional configuration example of a reception apparatus according to a fifth embodiment.

FIG. 25 is a diagram illustrating a functional configuration example of a reception apparatus according to a fifth embodiment of the present invention. The reception apparatus according to the present embodiment receives an SC block signal transmitted by the transmission apparatus described in the third embodiment.

The reception apparatus according to the present embodiment is similar to the reception apparatus according to the fourth embodiment, except that a demodulation/decoding/same quadrant demapping unit (demodulation/decoding unit) 19-1 is included instead of the fixed-symbol removal unit 19 and the demodulation/decoding unit 20. Constituent elements having functions identical to those of the fourth embodiment are denoted by like reference signs in the fourth embodiment, and redundant explanations thereof will be omitted.

The demodulation/decoding/same quadrant demapping unit 19-1 removes fixed bits from the same-quadrant symbols in accordance with the signal after the IDFT processing has been performed by the IDFT unit 18, and handles the remaining bits after removal of the fixed bits as data bits to perform the decoding processing. The data symbols other than the same-quadrant symbols are subjected to the demodulation and decoding processing as in the fourth embodiment.

As described above, in the present embodiment, the reception apparatus that receives the SC block signal transmitted from the transmission apparatus described in the third embodiment has been described. The reception apparatus performs downsampling, removes the fixed bits from the same-quadrant symbols, and handles the remaining bits after removal of the fixed bits as data bits to perform the demodulation and decoding processing. Accordingly, the signal transmitted from the transmission apparatus described in the third embodiment can be demodulated and decoded.

In the embodiments described above, an example of performing SC transmission has been described; however, the present invention is not limited thereto, and can be applied to a transmission apparatus and a reception apparatus of various systems including a wired system. Further, the present invention has been described by using DFT and IDFT processing; however, the present invention is not limited thereto, and FFT (Fast Fourier Transform) and IFFT (Inverse FFT) can be used, and a plurality of methods can be combined. The configurations of the transmission apparatus and the reception apparatus are not limited to the apparatus configurations described in the respective embodiments.

Furthermore, an example of inserting the CP as a guard interval has been described in the embodiments described above; however, a guard interval other than the CP can be used. Also in this case, it suffices that the head data symbol and the head of the guard interval are arranged as fixed symbols (or the same-quadrant symbols).

Sixth Embodiment

A transmission apparatus according to a sixth embodiment is described next. In the first embodiment, an example of using a plurality of types of fixed symbols has been described. In the present embodiment, as an expansion thereof, a method of arranging fixed symbols for suppressing the out-of-band spectrum is described.

Figure 26:
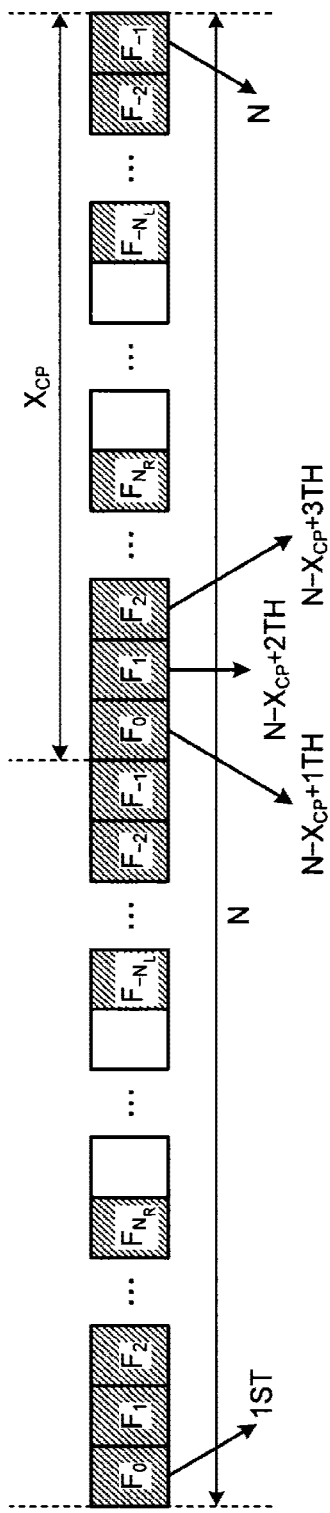
FIG. 26 is a diagram illustrating an arrangement example of fixed symbols according to a sixth embodiment.

FIG. 26 is a diagram illustrating an arrangement example of fixed symbols according to the present embodiment. In FIG. 26, a blank portion where no character is written indicates a data symbol and $F_i$ denotes a fixed symbol. In the present embodiment, it is assumed that $N_L+N_R+1$ symbols among N symbols in one block are fixed symbols. When $X_{CP}$th ($X_{CP}$ denotes the number of symbols corresponding to a portion to be copied as the CP), and when N-point DFT processing is performed in the subsequent processing, $X_{CP}=N_{CP}$ (the number of symbols to be copied as the CP)) symbol from the end is assumed to be a reference, $N_R$ denotes the number of fixed symbols continuous to the right side (to the rear side) from the reference, and $N_L$ denotes the number of fixed symbols continuous to the left side from the reference. In the present embodiment, the $N_L+N_R+1$ symbols are referred to as a "fixed symbol series". As illustrated in FIG. 26, the fixed symbol series is expressed as $[F_{-NL}, F_{-NL+1}, F_{-NL+2}, \ldots, F_{-1}, F_0, F_1, \ldots, F_{NR}]$. The subscripts NL and NR respectively denote $N_L$ and $N_R$. There is no limitation on the values of the respective symbols $F_i$ in the fixed symbol series, and two or more of $F_i$ can be the same value. If power normalization is to be performed after arrangement of the fixed symbol series in the block symbol, $F_i$ can be set to different values, respectively. For example, as $F_i$, a symbol such as M-PSK (M-ary-Phase Shift Keying) and M-QAM (M-ary Quadrature Amplitude Modulation) can be used, or several of $F_i$ can be set to zero. Further, the series described in "D. C. Chu, "Polyphase Codes With Good Periodic Correlation Properties", IEEE Transactions on Information Theory, pp. 531-532, July 1972" can be used as the fixed symbol series.

To obtain the spectrum suppression effect, the same fixed symbol series is used in all the blocks, and the same fixed symbols are arranged at the same positions between the blocks. The method of arranging the fixed symbol series is as described below. $F_0$ of the fixed symbol series is arranged at the first position and the $X_{CP}$th $((N-X_{CP}+1)$th position from the head) position from the end in the block. With reference to these positions, the fixed symbols are arranged on the right and left of the reference position in the order of $[F_{-NL}, F_{-NL+1}, F_{-NL+2}, \ldots, F_{-1}, F_0, F_1, \ldots, F_{NR}]$ such that the relative sequence of the fixed symbol series is not changed.

For example, as illustrated in FIG. 26, $F_0$ is arranged at the $(N-X_{CP}+1)$th position from the head in the block, and with reference to the position of $F_0$, $[F_1, \ldots, F_{NR}]$ is arranged continuous to $F_0$ on the right side of the reference position, and $[F_{-NL}, F_{-NL+1}, F_{-NL+2}, \ldots, F_{-1}]$ (a first symbol group) is arranged on the left side of the reference position. Further, $F_0$ is arranged in the first fixed symbol in the block, and $[F_0, F_1, \ldots, F_{NR}]$ (a second symbol group) is arranged after $F_0$ as the reference position (at the reference position and on the right side of the reference position). After insertion of the CP, the rear portion of a portion to be copied as the CP is added before the first fixed symbol in FIG. 26. Therefore, the fixed symbols are arranged such that the last $N_L$ fixed symbols of the block signal become $[F_{-NL}, F_{-NL+1}, F_{-NL+2}, \ldots, F_{-1}]$. Accordingly, after insertion of the CP, with reference to the first position in FIG. 26, $[F_1, \ldots, F_{NR}]$ is arranged continuous to $F_0$ on the right side of the reference position and $[F_{-NL}, F_{-NL+1}, F_{-NL+2}, \ldots, F_{-1}]$ is arranged on the left side of the reference position. When interpolation processing is performed as in the first embodiment, the interpolated sample point is added between symbols. However, due to the circularity of the IDFT output, the interpolated point to be added after the last symbol becomes a point that interpolates between the last symbol $F_{-1}$ and the first symbol $F_0$. Further, the head of the block signal after insertion of the CP becomes the $(N-X_{CP}+1)$th fixed symbol $F_0$ from the head of FIG. 26. Thus, the continuity of the phase and amplitude between blocks can be maintained; therefore, the out-of-band spectrum can be suppressed. Further, by increasing $N_L$ and $N_R$, an effect of further suppressing the out-of-band spectrum can be acquired.

It is assumed here that $X_{CP}$ is a sufficiently larger value than $N_L+N_R+1$ so that the fixed symbols $[F_{-NL}, F_{-NL+1}, F_{-NL+2}, \ldots, F_{-1}]$ behind the CP portion of the data and the fixed symbols $[F_0, F_1, \ldots, F_{NR}]$ arranged from the $(N-X_{CP}+1)$th position do not overlap with each other. For example, all the fixed symbols can be set to zero like $F_i=0$.

Figure 27:
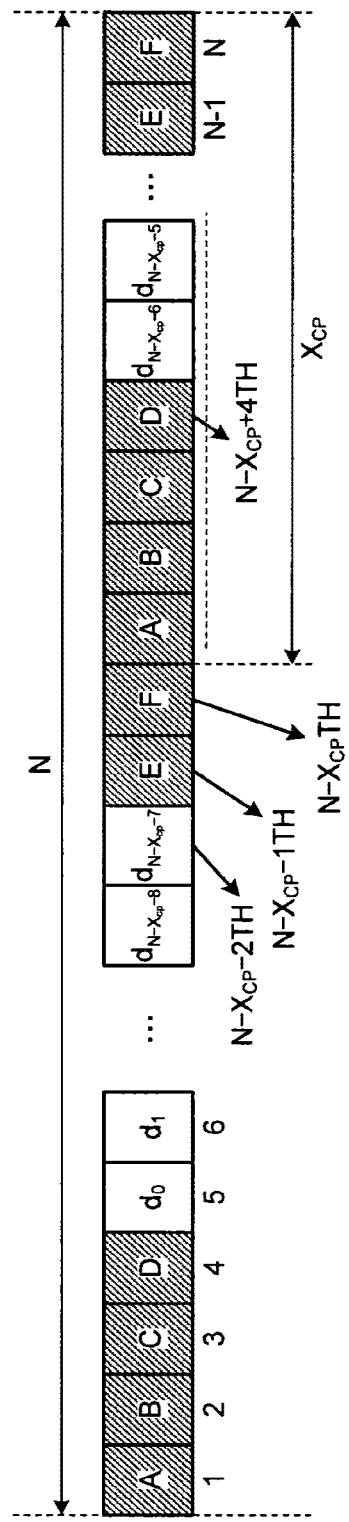
FIG. 27 is a diagram illustrating a specific example of arrangement of a fixed symbol series according to the sixth embodiment.
Figure 28:
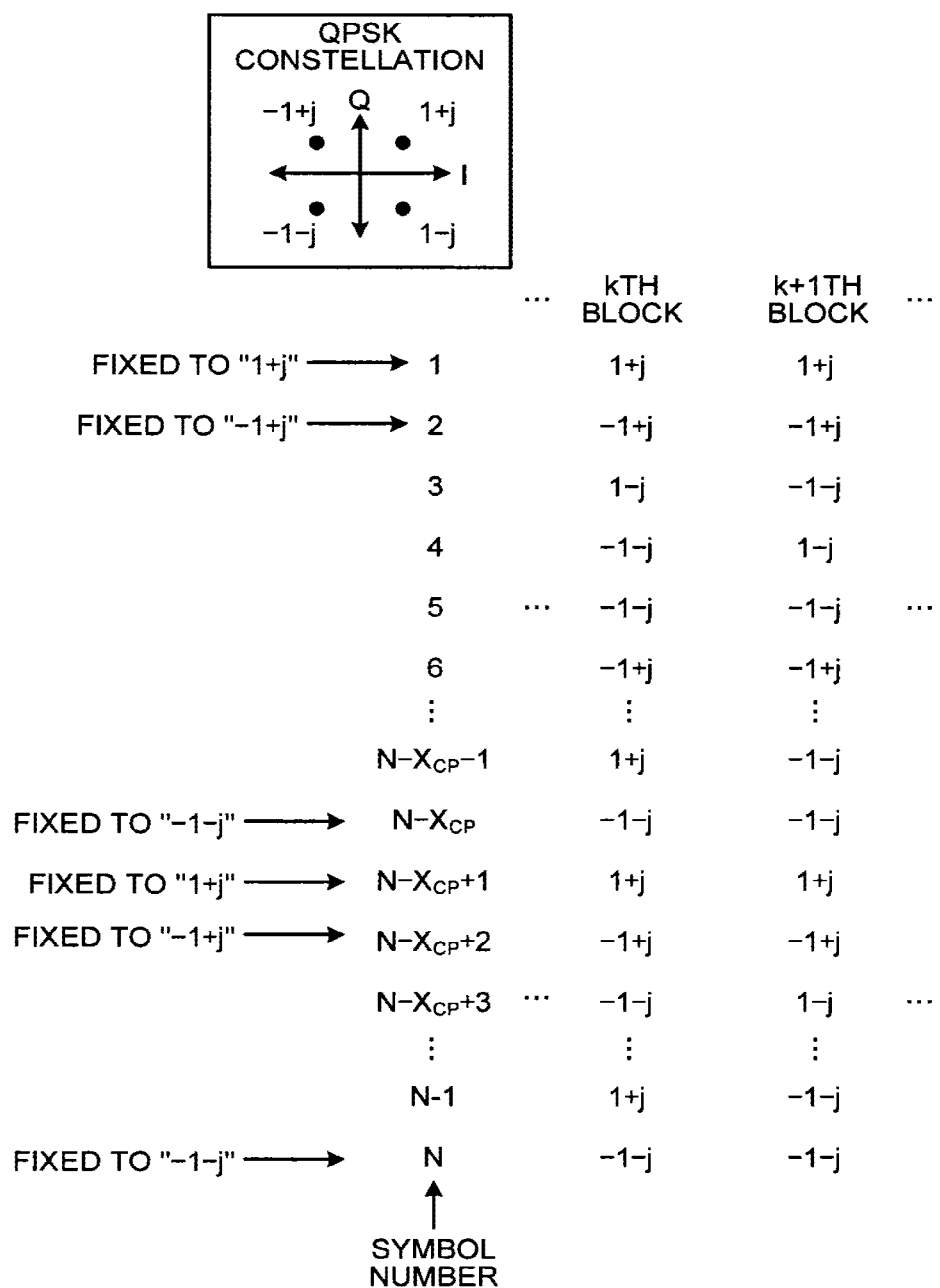
FIG. 28 is a diagram illustrating another specific example of arrangement of the fixed symbol series according to the sixth embodiment.

FIG. 27 is a diagram illustrating a specific example of arrangement of the fixed symbol series according to the present embodiment. In the example in FIG. 27, it is assumed that the fixed symbol series is [E, F, A, B, C, D], $N_L=3$, and $N_R=2$. FIG. 28 is a diagram illustrating another specific example of arrangement of the fixed symbol series according to the present embodiment. In the example in FIG. 28, it is assumed that $N_R=1$, $N_R=2$, and the fixed symbol series are $F_1=-1-j$, $F_{-1}=-1+j$, and $F_0=1+j$. In all the blocks, as illustrated in FIG. 28, the fixed symbol series are arranged at the $(N-X_{CP})$th, $(N-X_{CP}+1)$th, $(N-X_{CP}+2)$th, N-th, first, and second positions. According to the interpolation method, phase rotation is applied to the output symbol; however, phase rotation can be applied to the fixed symbol series so that a desired phase appears in the time domain.

Figure 29:
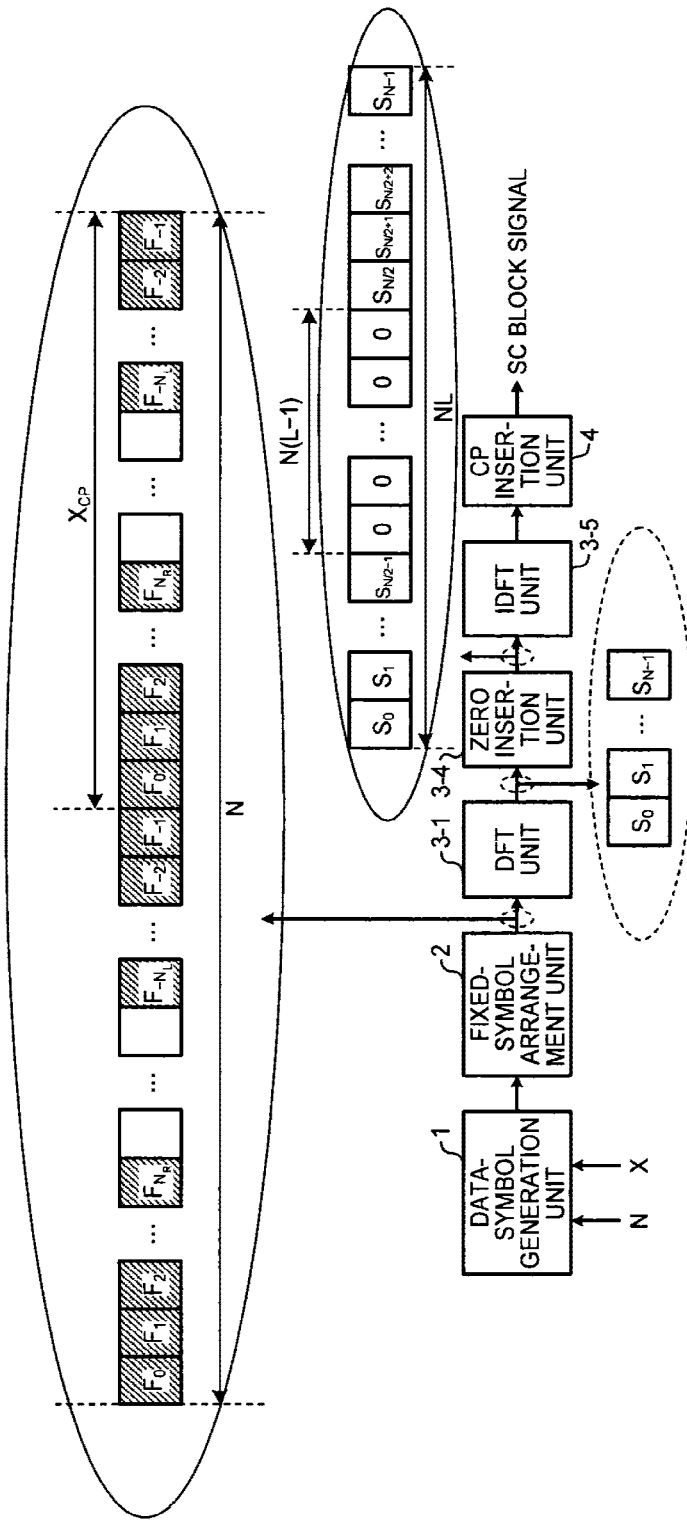
FIG. 29 is a diagram illustrating a configuration example and a processing example of a transmission apparatus according to the sixth embodiment.

FIG. 29 is a diagram illustrating a configuration example and a processing example of the transmission apparatus according to the present embodiment. The example in FIG. 29 has such a configuration that a zero insertion unit 3-4 and an IDFT unit 3-5 are provided instead of the oversampling/IDFT unit 3-3 with respect to the configuration of the first embodiment illustrated in FIG. 7. In FIG. 29, the waveform shaping filter 3-2 is removed to simplify the drawing. However, the waveform shaping filter 3-2 can be provided. The data-symbol generation unit 1, the fixed-symbol arrangement unit 2, the CP insertion unit 4, and the DFT unit 3-1 are similar to those in the first embodiment. However, the fixed-symbol arrangement unit 2 performs generation and arrangement of the fixed symbol series described in the present embodiment. As the interpolation method, any method can be used. FIG. 29 illustrates an example in which interpolation is performed by zero insertion and IDFT as an example, and the output $[s_0, s_1, \ldots, s_{N-1}]$ of N points after the DFT processing is divided into two and the zero insertion unit 3-4 inserts zero into the middle (between $s_{N/2-1}$ and $s_{N/2}$) (N·(L−1) zeroes are inserted). L denotes a multiplying factor in the oversampling as in the first embodiment. The zero insertion method is similar to that in the first embodiment. The IDFT unit 3-5 performs IDFT processing on the zero-inserted data.

After zero insertion, as illustrated in FIG. 29, NL signals including zeroes and an DFT output such as $[s_0, s_1, \ldots, s_{N/2-1}, 0, 0, \ldots, 0, 0, s_{N/2}, s_{N/2+1}, \ldots, s_{N-1}]$ are output. In the example in FIG. 29, $x=N_L+N_R+1$.

Figure 30:
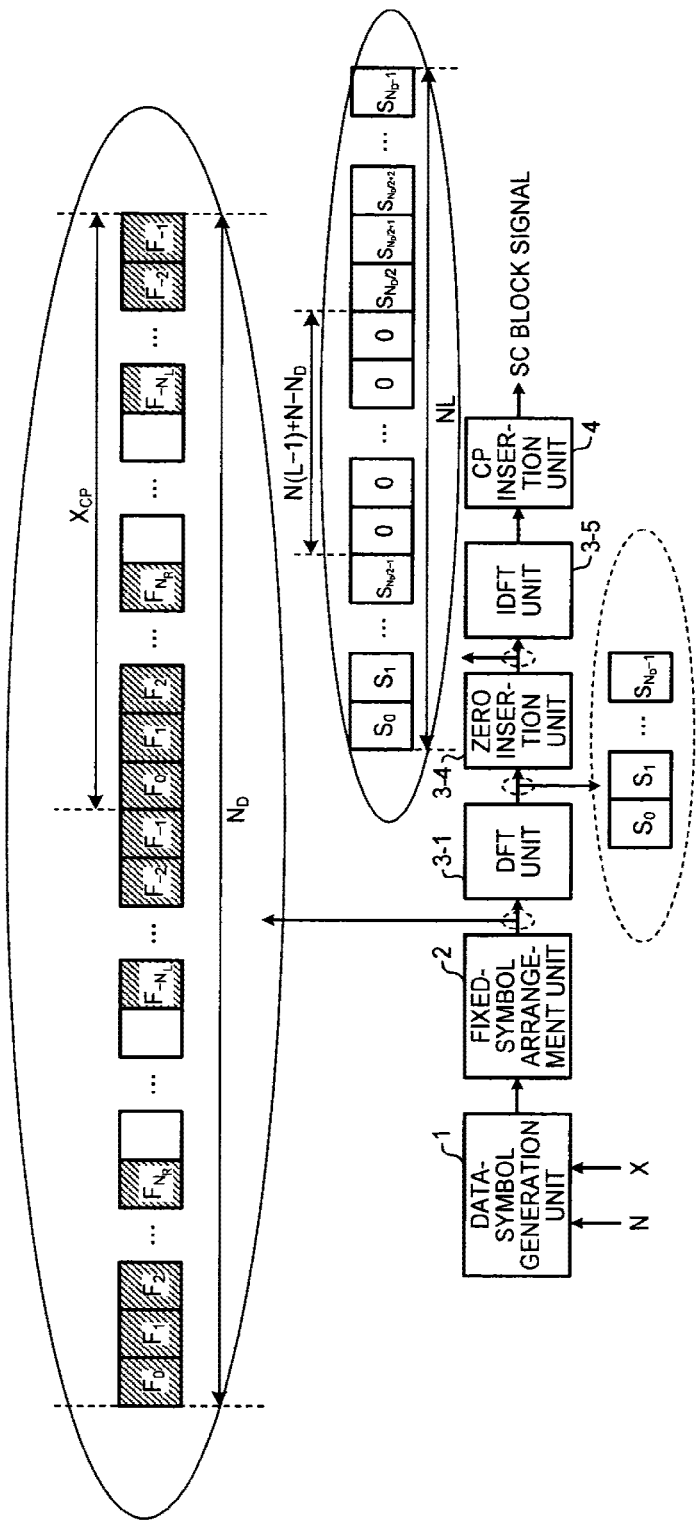
FIG. 30 is a diagram illustrating another processing example of the transmission apparatus according to the sixth embodiment.

FIG. 30 is a diagram illustrating another processing example of the transmission apparatus according to the present embodiment. The configuration of the transmission apparatus illustrated in FIG. 30 is similar to that in FIG. 29. In the example in FIG. 30, a configuration example in which the number of data points $N_D$ at which DFT processing is performed is larger than the number of symbols N in one block is illustrated. In this case, the DFT unit 3-1 performs DFT processing of $N_D$ points. When the DFT processing of $N_D$ points is to be performed, for example, zero insertion is performed in order to change N data points to $N_D$ data. However, there is no limitation on the DFT processing method of the $N_D$ points. In this case, the output from the DFT unit 3-1 becomes $[s_0, s_1, \ldots, s_{ND-1}]$. Also in this case, as in the example in FIG. 29, the output after the DFT processing is divided into two, and 0 is inserted into the middle. The number of zeroes to be inserted becomes N·(L−1)+N−N$_D$. If 0≤k≤N$_D$/y−1 when (L×x)/(L×N)=y/N$_D$ is satisfied, the (ky+1)th data signal before input to the IDFT unit 3-5, to which phase rotation and amplitude adjustment are applied, is output as the (kLx+1)th signal of the output signal of the IDFT unit 3-5. Therefore, x, y, and k only need to be set so that N$_{CP}$=N−kx and X$_{CP}$=N$_D$−ky.

Furthermore, in the present embodiment, the fixed symbol series becomes the same between the blocks. However, the present embodiment can be configured such that the fixed symbol series becomes the same-quadrant symbol as described in the third embodiment. As a specific example, the symbol arrangement example in FIG. 28 is used. For example, in the case where the 64QAM signal as illustrated in FIG. 20 is used, if the first two bits of symbols having the symbol number N−X$_{CP}$ and the symbol number N are fixed to "00", the first two bits of symbols having the symbol number N−X$_{CP}$+1 and the symbol number 1 are fixed to "01", and the first two bits of symbols having the symbol number N−X$_{CP}$+2 and the symbol number 2 are fixed to "11", it is possible to use 4×3=12 bits in total as data bits. As described in the second embodiment and with reference to the drawings, when the pilot symbols are multiplexed, the fixed symbol series of the present embodiment can be used.

As described above, according to the present embodiment, with reference to the positions of the first symbol and the head of a portion to be copied in the CP insertion of the block symbol, the same fixed symbol series is arranged in each block before and after the reference position. Accordingly, the continuity of the phase and amplitude between blocks can be maintained; therefore, the out-of-band spectrum can be suppressed.

INDUSTRIAL APPLICABILITY

As described above, the transmission apparatus, the reception apparatus, and the communication system according to the present invention are useful in a communication system that performs SC block transmission, and are particularly suitable for a communication system that performs CP insertion.

REFERENCE SIGNS LIST

1, 1-1, 1-2 data-symbol generation unit, 2, 2-2 fixed-symbol arrangement unit, 3 interpolation unit, 3-1 DFT unit, 3-2, 3-20, 3-21 waveform shaping filter, 3-3 oversampling/IDFT unit, 3-4 zero insertion unit, 3-5 IDFT unit, 4 CP insertion unit, 5 frequency-domain arrangement unit, 6 pilot-signal generation unit, 7 frequency/time domain conversion unit, 8 time-domain multiplexing unit, 9 same-quadrant mapping unit, 12 synchronization unit, 13 CP removal unit, 14 DFT unit, 15 sampling unit, 16 transmission-line estimation unit, 17 FDE unit, 18 IDFT unit, 19 fixed-symbol removal unit, 19-1 demodulation/decoding/same quadrant demapping unit, 20 demodulation/decoding unit.

The invention claimed is:

1. A transmission apparatus that transmits a block signal including a plurality of data symbols, the transmission apparatus comprising:
   a data-symbol generator circuit that generates data symbols;
   a symbol arranger circuit that arranges the data symbols and same-quadrant symbols in a time domain such that two or more same-quadrant symbols that become signal points in a same quadrant in a complex plane are inserted at predetermined positions in a block signal to generate a block symbol;
   an interpolator circuit that performs interpolation processing on the block symbol; and
   a Cyclic Prefix inserter circuit that inserts a Cyclic Prefix into a signal on which the interpolation processing has been performed to generate the block signal, wherein
   the predetermined positions are a first position that is a head of the block symbol and a second position that is equivalent to the location of head of the symbol to be copied as a Cyclic Prefix,
   the symbol arranger circuit generates a symbol series that includes a plurality of symbols including the same-quadrant symbols,
   the symbol series includes a first symbol group before a first symbol position and a second symbol group after the first symbol position, and
   the symbol arranger circuit arranges the second symbol group such that the first and second positions become a head of the second symbol group, and arranges the first symbol group such that a last symbol of the block symbol and a symbol that is one before the second position become a last symbol of the first symbol group.

* * * * *